United States Patent
Inaba et al.

(10) Patent No.: US 8,886,359 B2
(45) Date of Patent: Nov. 11, 2014

(54) ROBOT AND SPOT WELDING ROBOT WITH LEARNING CONTROL FUNCTION

(75) Inventors: Kiyonori Inaba, Minamitsuru-gun (JP); Masakazu Ichinose, Minamitsuru-gun (JP)

(73) Assignee: FANUC Corporation, Minamitsuru-gun, Yamanashi (JP)

(*) Notice: Subject to any disclaimer, the term of this patent is extended or adjusted under 35 U.S.C. 154(b) by 370 days.

(21) Appl. No.: 13/469,725

(22) Filed: May 11, 2012

(65) Prior Publication Data

US 2012/0296471 A1  Nov. 22, 2012

(30) Foreign Application Priority Data

May 17, 2011 (JP) .................. 2011-110787
Aug. 17, 2011 (JP) .................. 2011-178634

(51) Int. Cl.
| | | |
|---|---|---|
| G05B 19/04 | (2006.01) | |
| G05B 19/18 | (2006.01) | |
| B25J 9/16 | (2006.01) | |
| B23K 11/11 | (2006.01) | |

(52) U.S. Cl.
CPC ..... B23K 11/115 (2013.01); G05B 2219/39195 (2013.01); B25J 9/163 (2013.01); B25J 9/1694 (2013.01); G05B 2219/45104 (2013.01); G05B 2219/40547 (2013.01); Y10S 901/46 (2013.01); Y10S 901/47 (2013.01)
USPC ............. 700/253; 700/245; 700/254; 901/46; 901/47

(58) Field of Classification Search
CPC ...... B25J 9/163; B25J 9/1694; B23K 11/115; G05B 2219/39195; G05B 2219/40547
USPC ................ 700/245–264; 318/568.1, 568.11, 318/568.13, 568.14, 568.22, 573, 576, 601, 318/625, 609; 901/42, 46, 47, 1, 3, 8, 9
See application file for complete search history.

(56) References Cited

U.S. PATENT DOCUMENTS

| 4,894,596 A | 1/1990 | Hara |
|---|---|---|
| 7,205,743 B2 | 4/2007 | Iwashita et al. |
| 2005/0102060 A1 | 5/2005 | Watanabe et al. |

(Continued)

FOREIGN PATENT DOCUMENTS

| JP | 61-114317 | 6/1986 |
|---|---|---|
| JP | 62-284408 | 12/1987 |

(Continued)

*Primary Examiner* — Jason Holloway
*Assistant Examiner* — Rachid Bendidi
(74) *Attorney, Agent, or Firm* — Drinker Biddle & Reath LLP

(57) ABSTRACT

A robot (100) has a robot mechanism unit (1) having a sensor (10) and a control unit (2), and the control unit (2) includes a normal control unit (4) that controls the operation of the robot mechanism unit, and a learning control unit (3) that, when the robot mechanism unit (1) is operated by a speed command that is given by multiplying a teaching speed designated in a task program by a speed change ratio, performs learning to calculate, from a detection result by the sensor (10), a learning correction amount for making the trajectory or position of the control target in the robot mechanism unit (1) approach the target trajectory or target position, or for reducing the vibration of the control target, and performs processes so that the control target position of the robot mechanism unit (1) moves along a fixed trajectory regardless of the speed change ratio.

22 Claims, 20 Drawing Sheets

(56) References Cited

U.S. PATENT DOCUMENTS

| | | | |
|---|---|---|---|
| 2005/0107920 A1* | 5/2005 | Ban et al. | 700/245 |
| 2006/0082340 A1* | 4/2006 | Watanabe et al. | 318/568.21 |
| 2007/0213873 A1* | 9/2007 | Ban et al. | 700/245 |
| 2009/0125146 A1* | 5/2009 | Zhang et al. | 700/253 |
| 2011/0208354 A1* | 8/2011 | Kato et al. | 700/246 |
| 2011/0208356 A1* | 8/2011 | Kato et al. | 700/253 |

FOREIGN PATENT DOCUMENTS

| | | |
|---|---|---|
| JP | 63-298501 | 12/1988 |
| JP | 02-284831 | 11/1990 |
| JP | 06-035525 | 2/1994 |
| JP | 06-274228 | 9/1994 |
| JP | 10-100085 | 4/1998 |
| JP | 63-273108 | 11/1998 |
| JP | 11-293214 | 10/1999 |
| JP | 2001-022423 | 1/2001 |
| JP | 2005-138223 | 6/2005 |
| JP | 2005-149299 | 6/2005 |
| JP | 2005-153047 | 6/2005 |
| JP | 2005-186193 | 7/2005 |
| JP | 2006-110702 | 4/2006 |
| JP | 2006-172149 | 6/2006 |
| JP | 2006-215740 | 8/2006 |
| JP | 2007-7666 | 1/2007 |
| JP | 2007-268590 | 10/2007 |
| JP | 2009-204467 | 9/2009 |
| JP | 2011-062793 | 3/2011 |
| JP | 2011-088177 | 5/2011 |
| JP | 2011-167817 | 9/2011 |
| JP | 2011-192267 | 9/2011 |

* cited by examiner

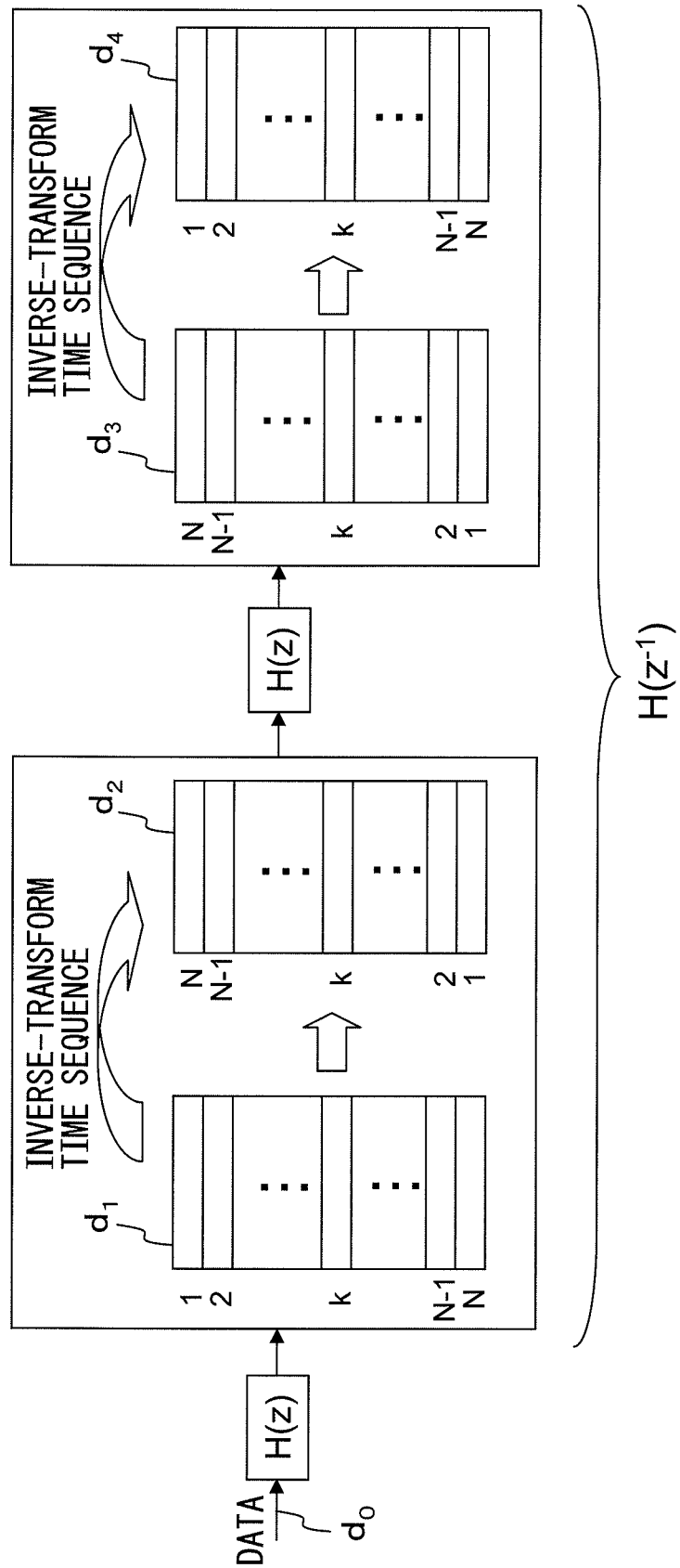

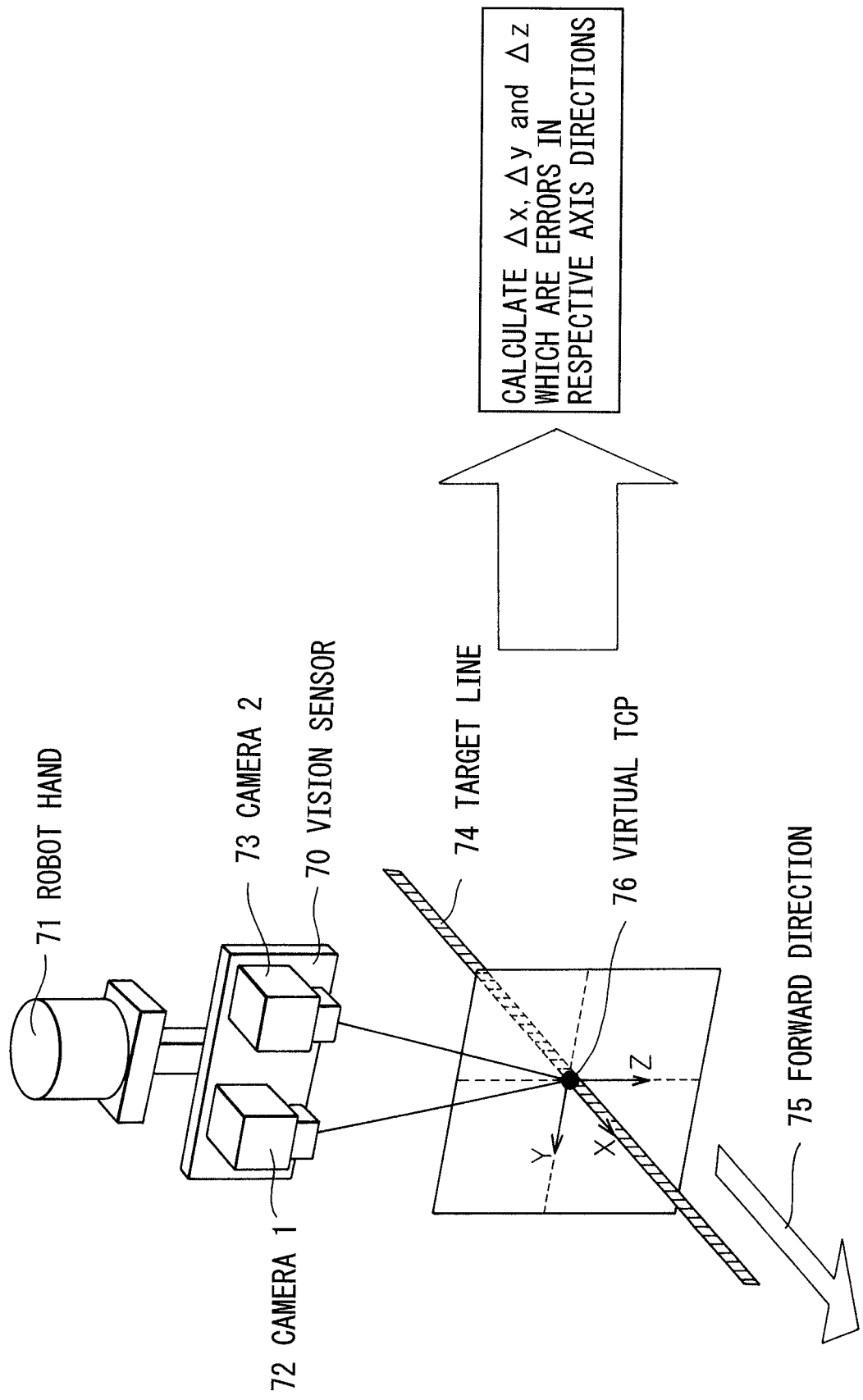

_(1)_

ROBOT AND SPOT WELDING ROBOT WITH LEARNING CONTROL FUNCTION

This application is a new U.S. patent application that claims benefit of JP 2011-110787 filed on May 17, 2011 and 2011-178634 filed on Aug. 17, 2011, the content of 2011-110787 and 2011-178634 is incorporated herein by reference.

FIELD OF THE INVENTION

The present invention relates to a robot and spot welding robot having a learning control function. More particularly, the present invention relates to a robot and spot welding robot that increase the speed of operation using a sensor attached to an arm.

BACKGROUND OF THE INVENTION

In a robot, the position and speed of a part to be driven by a servo-motor (hereinafter, also referred to as "motor") are controlled. Consequently, normally, position feedback control, speed feedback control and furthermore current feedback control are executed. These controls are executed until the position and speed of the driven part match the commanded position and the commanded speed.

Even if the position feedback control, speed feedback control and furthermore current feedback control are executed, when a robot is operated at high-speed, a trajectory error and a position vibration component may be produced. Also, in high-speed operation, the dynamic characteristics of the motor and the dynamic characteristics of the arm are different. Consequently, it is not possible to measure the trajectory error and position vibration component of the arm directly using a motor encoder which is provided near the motor for driving the arm. Therefore, it is necessary to mount a sensor directly on the arm in order to measure the trajectory error and position vibration component. It is known that learning control is executed using an acceleration sensor for such a sensor (see Patent Document 1).

FIG. 1 is a schematic diagram showing a robot having a learning control filter to carry out learning control. A robot 1000 is configured with a robot mechanism unit 1 and a control unit 2 that controls the robot mechanism unit 1. The control unit 2 includes a learning control unit 3 that carries out learning control for the robot, and a normal control unit 4 that directly drives the robot mechanism unit 1.

In the robot mechanism unit 1, an acceleration sensor 10, an arm 11, an arm forward end portion 12 (hereinafter also referred to as "gun"), and a motor (not shown) are provided. The normal control unit 4 included in the control unit 2 drives the arm 11 and moves the arm forward end portion 12 to a desired position, by inputting signals in the motor of the robot mechanism unit 1, and carries out tasks such as welding, for example. The acceleration sensor 10 is installed in the arm forward end portion 12, and therefore can acquire spatial position data $(y_j(k))$ of the arm forward end portion 12. The position data $(y_j(k))$ obtained from the acceleration sensor 10 is input to the learning control unit 3 and used for learning control. The symbol "j" of "$y_j(k)$" designates the number of tries, the symbol "k" of "$y_j(k)$" designates time, and the symbol "Ns" of a delay circuit 361 in FIG. 1 designates the number of the times sampling is made in each one trial. "$y_d(k)$" designates position command data, and "$y_j(k)$" designates the amount subjected to control at a previous trial. "$e_j(k)$" designates the target correction amount calculated

_(2)_ from $y_d(k)$ and $(y_j(k))$ through a filter, and "$u_j(k)$" designates learning correction amount at a previous trial.

In the normal control unit 4, a position control unit 41, a speed control unit 42, a current control unit 43, an amplifier 44 and a differentiation means 45 are provided. The position control unit 41 receives position command data $(y_d(k))$ that is input from outside the control unit 2. The position control unit 41 furthermore receives position information of, for example, the motor position of the robot mechanism unit 1, and outputs desired position information for the arm forward end portion 12 of the robot mechanism unit 1, to the speed control unit 42. The differentiation means 45 receives the motor position information that is fed back from the robot mechanism unit 1, calculates the motor speed, and outputs this motor speed to the speed control unit 42.

The speed control unit 42 calculates the desired motor speed taking into account the position information from the position control unit 41 and the motor speed information from the differentiation means 45, and outputs this desired motor speed to the current control unit 43. The current control unit 43 receives the current value that is fed back from the amplifier 44. Furthermore, the current control unit 43 calculates the current to flow in the motor to achieve the desired motor speed input from the speed control unit 42, and outputs the resulting current to the amplifier 44. The amplifier 44 calculates the desired power based on the current value from the current control unit 43, and applies this to the motor (not shown) of the robot mechanism unit 1.

In the learning control unit 3, a first memory 31, a learning control filter L(q) 32, a low-pass filter Q(q) 33, a second memory 34, a delay circuit 361 and a third memory 362 are provided. The first memory 31 receives target correction amount $e_j(k)$ calculated from the position command data $(y_d(k))$ for the arm forward end portion 12 and the position data $(y_j(k))$ measured by the acceleration sensor 10 through a filter. The first memory 31 stores the target correction amount $e_j(k)$ received as input, and also outputs the target correction amount $e_j(k)$ to the learning control filter L(q) 32. The target correction amount $e_j(k)$ corresponds to the trajectory/vibration errors against the desired position of the arm forward end portion 12.

By executing the task program stored in the learning control filter L(q) 32, the learning control filter L(q) 32 calculates a learning correction amount $u_{j+1}(k)$, from the target correction amount $e_j(k)$ and $u_j(k)$, and outputs this learning correction amount $u_{j+1}(k)$ to the low-pass filter Q(q) 33. The learning correction amount $u_{j+1}(k)$ that is input to the low-pass filter Q(q) 33 is output to the second memory 34 and stored in the second memory 34. The learning correction amount $u_{j+1}(k)$ is added to position error data that is calculated in the position control unit 41 of the normal control unit 4.

Based on the corrected position error data, the robot mechanism unit 1 is controlled, and learning control is repeated. In the learning control, this series of processes are repeatedly executed so that the position error converges to "0". After the operation for calculating the learning correction amount by learning control is finished, i.e., after the learning operation is finished, the loop for updating the learning correction amount, which is indicated by dotted lines in FIG. 1, is not executed. Instead, the learning correction amount $u_{j+1}(k)$ is output from the second memory 34 to the position control unit 41. The solid line parts and dotted line parts in FIG. 1, which represent signal flows, will be explained. The solid line parts represent parts which the normal control unit 4 implements to operate the robot mechanism unit 1. On the other hand, the dotted line parts represent parts which the learning control unit 3 implements in a state of the learning operation. The dotted lines represent parts which are implemented after the operation of the robot mechanism unit 1 by the normal control unit 4 is finished.

As examples of robot application, a robot for spot welding has been reported (see, for example, Patent Documents 2 and 3). Also, an example of a robot with a vision sensor detecting position of an object and perform spot welding by the robot is disclosed (see, for example, Patent Document 4).

Patent Document 1: Japanese Patent Application Publication No. 2006-172149
Patent Document 2: Japanese Patent Application Publication No. 2007-268590
Patent Document 3: Japanese Patent Application Publication No. 2007-7666
Patent Document 4: Japanese Patent Application Publication No. 2005-138223

Conventional learning control focuses on improvement of trajectory/vibration errors under certain conditions. However, there is a problem, with conventional learning control, that the range of application is narrow and usability is given not much thought.

The aforementioned conventional technique described above as an example of learning control using a sensor is an example of a machine tool and yet assumes the use of an acceleration sensor for the sensor. In the case an acceleration sensor is mounted on a robot, although the trajectory/position errors can be extracted in orthogonal coordinates, there is still a problem that, in this condition, it is not possible to calculate the trajectory/position errors on each axis directly from the sensor data.

Also, according to the conventional technique described above, a normal high-pass filter is used to extract the trajectory/vibration errors from the acceleration sensor. With machine tools, the frequency band for feedback control is as high as several tens of Hz to several hundred Hz. That is to say, feedback control has very high performance in this frequency band. Consequently, no serious problem is posed even in the case where learning control using data of not more than 10 [Hz] is not possible, and offset is not a significant problem. On the other hand, with industrial robots, the frequency band for feedback control is normally several [Hz], and frequency bands higher than this are subject to feed forward control. As a result of this, the performance is liable to depend on the model error, and therefore this part is corrected by learning control. For example, in the case where a high-pass filter of 1 [Hz] is used to remove the offset of acceleration sensor data, the phase of the trajectory/vibration errors up to about 10 [Hz] rotates. Consequently, the trajectory/vibration error data of frequency bands to be removed is also processed, posing a problem that learning control performance is deteriorated.

Furthermore, there are two difficult problems in adjusting a learning control filter. One is the condition of convergence. The condition of convergence refers to the guarantee that repeating learning will always leads to convergence. Unless this is guaranteed, every learning leads only to divergence and this eventually damages the operation. The second is the condition of monotonic decrease. This is a condition to guarantee that the trajectory/vibration errors decrease every time learning is executed. Unless this is guaranteed, there is a possibility that convergence is reached only after the trajectory/vibration errors increase significantly over the course toward convergence. This then results in a possibility that the trajectory drifts significantly and vibration is produced in the course of learning, causing damage to the peripheral devices. Adjustment for meeting these two conditions is in fact mostly made by trial and error in most work fields. Also, given that the robot system changes in accordance with the posture, robustness also has to be taken into account. Learning control filters have become too complex taking into account these factors, and are therefore very difficult to implement. Furthermore, the calculation in the course of design is too complex. Consequently, in reality, no controllers to fulfill these conditions are used for industrial robots. There are examples of usage for machine tools, adjustments are in reality made based on experience per application. At present, an industrial robot having a learning function to design parameters and increase speed to cope with such problems, is still unavailable.

Furthermore, the conventional, general spot welding robots disclosed in Patent Documents 2 and 3 simply perform spot welding by performing operations that are stored in advance. Consequently, there is a problem that optimal robot operations are blocked by trajectory error and vibration components that are produced by high-speed robot operations. Patent Document 4 discloses an example of detecting an object by a vision sensor and correcting the operation of a robot. With this example, it is not possible to optimize the operation of a robot itself that moves toward an object. As a result, as described above, trajectory errors and vibration components are produced, and these become factors to lower the speed of robot operations.

It is therefore an object of the present invention to provide a robot and spot welding robot with learning control functions, that, in a spot welding application in which productivity relies upon robot operations, detect the position of a part that is subject to position control and control this to approach closer to a target operation.

It is also an object of the present invention to provide a robot and spot welding robot that make it possible to improve productivity and reduce cost by increasing the speed of robot operation.

It is also an object of the present invention to provide a robot and spot welding robot that can reduce the system cost by reducing the number of robots required to perform tasks, reducing the line space, and reducing the steps to perform.

It is also an object of the present invention to provide a robot and spot welding robot that can solve the problem of offset with acceleration sensors, without risking deterioration of performance.

It is also an object of the present invention to provide a robot and spot welding robot that can automatically increase the speed of operation during learning.

It is also an object of the present invention to provide a robot and spot welding robot that can reduce the vibration of the spot welding robot and realize fast operation.

SUMMARY OF THE INVENTION

A robot according to one aspect of the present invention, includes a robot mechanism unit that has a sensor in a part that is subject to position control, and a control unit that controls an operation of the robot mechanism unit, and the control unit includes a normal control unit that controls the operation of the robot mechanism unit, and a learning control unit that, when the robot mechanism unit is operated by a speed command given by multiplying a teaching speed designated in a task program by a speed change ratio, calculates, from a result detected by the sensor, a learning correction amount for making a trajectory or position of a control target of the robot mechanism unit approach a target trajectory or target position that is assigned to the normal control unit, or for reducing a vibration of the control target that is produced when the robot mechanism unit is operated, and performs processes so that the control target position of the robot mechanism unit moves on a fixed trajectory regardless of the speed change ratio.

According to another aspect of the present invention, the learning control unit preferably calculates the learning correction amount while changing the speed change ratio over a plurality of times until reaching a predetermined maximum speed change ratio.

According to another aspect of the present invention, the predetermined maximum speed change ratio may be calculated by the learning control unit, based on data acquired when the robot mechanism unit is operated, a maximum speed and maximum acceleration that can be tolerated in the robot mechanism unit, or a duration of life of a decelerator.

According to another aspect of the present invention, the predetermined speed change ratio may be set in the control unit from outside.

According to another aspect of the present invention, a technique of designing a learning control filter by H-infinity norm, incorporating the concept of frequency response, is proposed. By this means, filter design to guarantee convergence and monotonic decrease from the frequency response of a robot by a systematic technique, not an experience-based technique, is made possible. Furthermore, regarding the robustness against change of posture, systematic calculation is made possible by incorporating uncertainties into H-infinity norm. This systematic technique reduces these filter design problems to a minimization problem of a decision-value sign matrix problem.

According to another aspect of the present invention, the control unit may further include a teaching control unit that teaches or corrects a position or speed in the task program, and the normal control unit may operate the robot mechanism unit by a position command that is based on the teaching position set in the task program, a learning correction amount that is calculated by the learning control unit, and a speed command that is given by multiplying the teaching speed set in the task program by a speed change ratio upon calculation of the learning correction amount, and, after the learning correction amount is calculated by the learning control unit, when the position of a teaching point is corrected by the teaching control unit, if a distance between the position of the teaching point after the position correction and the position of the teaching point before the position correction is equal to or greater than a predetermined distance, may control move to the teaching point at the teaching speed, and, if the distance is less than the predetermined threshold, may control the move to the teaching point by the speed command.

According to another aspect of the present invention, after the learning correction amount is calculated by the learning control unit, when the position of the teaching point is corrected by the teaching control unit, if the distance between the position of the teaching point after the position correction and the position of the teaching point before the position correction is equal to or greater than the predetermined distance, the normal control unit may control the move to the teaching point or move from the teaching point to a next teaching point at the teaching speed, and, if the distance is less than the predetermined threshold, may control the move to the teaching point or the move from the teaching point to the next teaching point by the speed command.

According to another aspect of the present invention, after the learning correction amount is calculated by the learning control unit, when the speed command is corrected by the teaching control unit, if a difference between the speed command after the correction and the speed command before the correction is equal to or greater than a predetermined rate or a predetermined value, the normal control unit may control the move to the teaching point at the teaching speed, and, if the difference is lower than the predetermined rate or the predetermined value, may control the move to the teaching point by the speed command.

According to another aspect of the present invention, the learning control unit may include a filter for calculating trajectory/vibration errors of the robot mechanism unit against data detected by the sensor.

According to another aspect of the present invention, the learning control unit preferably calculates a position on each axis including trajectory/vibration errors by inverse-transforming the data detected by the sensor into three basic axes.

According to another aspect of the present invention, the learning control unit may make the robot mechanism unit execute a predetermined operation, and calculates a position and inclination of the sensor.

According to another aspect of the present invention, the learning control unit preferably further includes a memory unit for storing the learning correction amount.

According to another aspect of the present invention, the sensor may be one of a vision sensor, an acceleration sensor, a gyro sensor, an inertial sensor, an optical sensor and a distortion gauge.

According to another aspect of the present invention, the sensor preferably has a mounting means that can be attached to and detached from the robot mechanism unit, and more preferably has a magnet as the mounting means.

A spot welding robot according to one aspect of the present invention includes: a robot mechanism unit that has a control target part that is subject to position control and a sensor that is mounted on the control target part; a normal control unit that acquires position command data related to a target trajectory or target position of the control target part, and, according to position error data that is calculated using the position command data, operates the robot mechanism unit at a predetermined operation speed, by a task program; and a learning control unit that calculates a trajectory or position of the control target part from a detection result of the sensor, and, by learning control, calculates a learning correction amount, for correcting a trajectory error between the trajectory and the target trajectory or a position error between the position and the target position, or for reducing a vibration of the control target part that is produced when the robot mechanism unit is operated, and, the normal control unit corrects the position error data using the learning correction amount, and the learning control unit, in a course of calculating the learning correction amount, calculates a maximum operation speed that can be set in the robot mechanism unit, and calculates the learning correction amount while increasing the operation speed in one time or over a plurality of times until reaching the maximum operation speed.

According to another aspect of the present invention, the normal control unit may acquire a target operation speed, which is a target value of the operation speed of the robot mechanism unit, and the learning control unit may compare the target operation speed and the maximum operation speed, and, when the target operation speed is less than the maximum operation speed, calculate the learning correction amount while increasing the operation speed in one time or a plurality of times until reaching the target operation speed.

According to another aspect of the present invention, the learning control unit preferably calculates the maximum operation speed based on a maximum speed and maximum acceleration that can be tolerated in the robot mechanism unit.

A spot welding robot according to another aspect of the present invention includes: a robot mechanism unit that has a control target part that is subject to position control and a sensor that is mounted on the control target part; a normal control unit that acquires position command data related to a target trajectory or target position of the control target part, and, according to position error data that is calculated using the position command data, operates the robot mechanism unit at a predetermined operation speed, by a task program; and a learning control unit that calculates a trajectory or position of the control target part from a detection result of the sensor, and, by learning control, calculates a learning correction amount, for correcting a trajectory error between the trajectory and the target trajectory or a position error between the position and the target position, or for reducing a vibration of the control target part that is produced when the robot mechanism unit is operated, and the normal control unit corrects the position error data using the learning correction amount; and the learning control unit performs a process of calculating the learning correction amount and comparing the trajectory error or the position error, or the vibration, within each threshold that is set in advance, and repeats the process, while increasing the operation speed, until the trajectory error or the position error, or the vibration, exceeds each threshold.

According to another aspect of the present invention, the normal control unit may acquire a target operation speed, which is a target value of the operation speed of the robot mechanism unit, and the learning control unit may increase the operation speed in one time or over a plurality of times until reaching the target operation speed, and upon every increase, perform a process of calculating a learning correction amount and comparing the trajectory error or the position error, or the vibration, within each threshold that is set in advance, and repeat the process, as long as the trajectory error or the position error, or the vibration, stays within each threshold, or until the operation speed reaches the target operation speed.

According to another aspect of the present invention, the learning control unit may calculate data on each axis by transforming data that is calculated from the detection result of the sensor and that includes the trajectory error, the position error or a vibration component of the control target part, into position coordinates based on each axis of the robot mechanism unit.

Effects of the Invention

A robot according to one aspect of the present invention performs processes so that the control target position of a robot mechanism unit moves on a fixed trajectory regardless of the speed change ratio. As a result of this, trajectory drift due to change of the speed change ratio is not produced, and therefore it is possible to improve the accuracy and safety of operation of the robot mechanism unit.

Furthermore, with a robot according to another aspect of the present invention, a learning control unit calculates the maximum speed change ratio that can be set in a learning operating state, and calculates a learning correction amount while changing the speed change ratio over a plurality of times until reaching the maximum speed change ratio. As a result of this, it is possible to actually increase the speed of operation during learning.

There is also an advantage that the system cost can be reduced by reducing the number of robots required to perform tasks, reducing the line space, and reducing the steps to perform. Furthermore, the number of robots to maintain can be reduced, and this helps reducing the cost of maintenance.

Furthermore, a robot according to another aspect of the present invention, it is possible to solve the problem of offset with acceleration sensors, by introducing a zero-phase filter, without risking deterioration of performance.

With a robot according to another aspect of the present invention, a learning control unit calculates the maximum speed of operation that can be set in a learning operating state, and calculates a learning correction amount while increasing the speed of operation in one time or over a plurality of times until reaching the maximum speed of operation. As a result of this, it is possible to automatically increase the speed of operation during learning.

A spot welding robot according to one aspect of the present invention has learning control functions to detect the position of a part that is subject to position control by a sensor and control this to approach closer to a target operation. As a result of this, it is possible to reduce the vibration of the spot welding robot and realize fast operation.

With a spot welding robot according to another aspect of the present invention, it is possible to increase the speed of operation of the robot and improve the work capacity of the robot by means of fast operation without vibration. In spot welding, improved productivity can be achieved by increasing the speed of robot operation. Also, with a spot welding system of the same cycle time, the same volume of spot welding is made possible by fewer spot welding robots, so that it is possible to reduce the system cost.

DESCRIPTION OF THE DRAWINGS

These and other features and advantages of the present invention will be better understood by reading the following detailed description, taken together with the drawings wherein:

FIG. 10 is a diagram for explaining the steps of data processing in a zero-phase high-pass filter;

FIG. 20 is a diagram showing an example of a vision sensor as an example of a sensor.

DETAILED DESCRIPTION OF THE PREFERRED EMBODIMENT

The robot and spot welding robot according to the present invention will be described below in detail with reference to the accompanying drawings. However, it should be noted that the technical scope of this invention is not limited to the embodiments described below and covers the invention described in the appended claims and equivalents thereof.

First Embodiment

Figure 2:
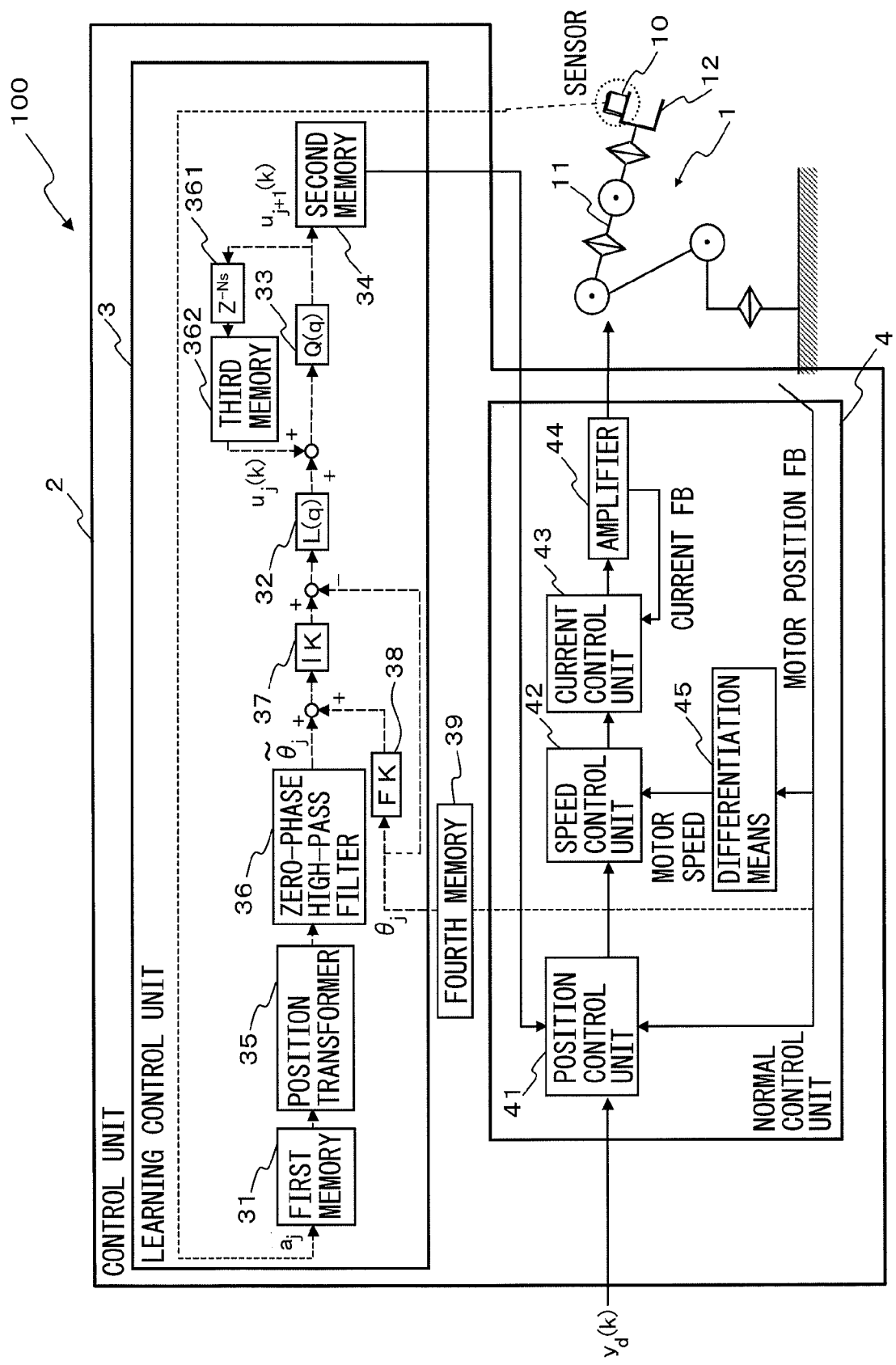
FIG. 2 is a diagram showing a configuration of a robot according to the first embodiment.

FIG. 2 is a schematic diagram of a robot 100 according to the first embodiment. The robot 100 is configured with a robot mechanism unit 1, and a control unit 2 that controls the robot mechanism unit 1. The control unit 2 has a learning control unit that executes learning control for the robot 100, and a normal control unit 4 that controls the operation of the robot mechanism unit 1 by driving the robot mechanism unit 1 directly.

Figure 1:
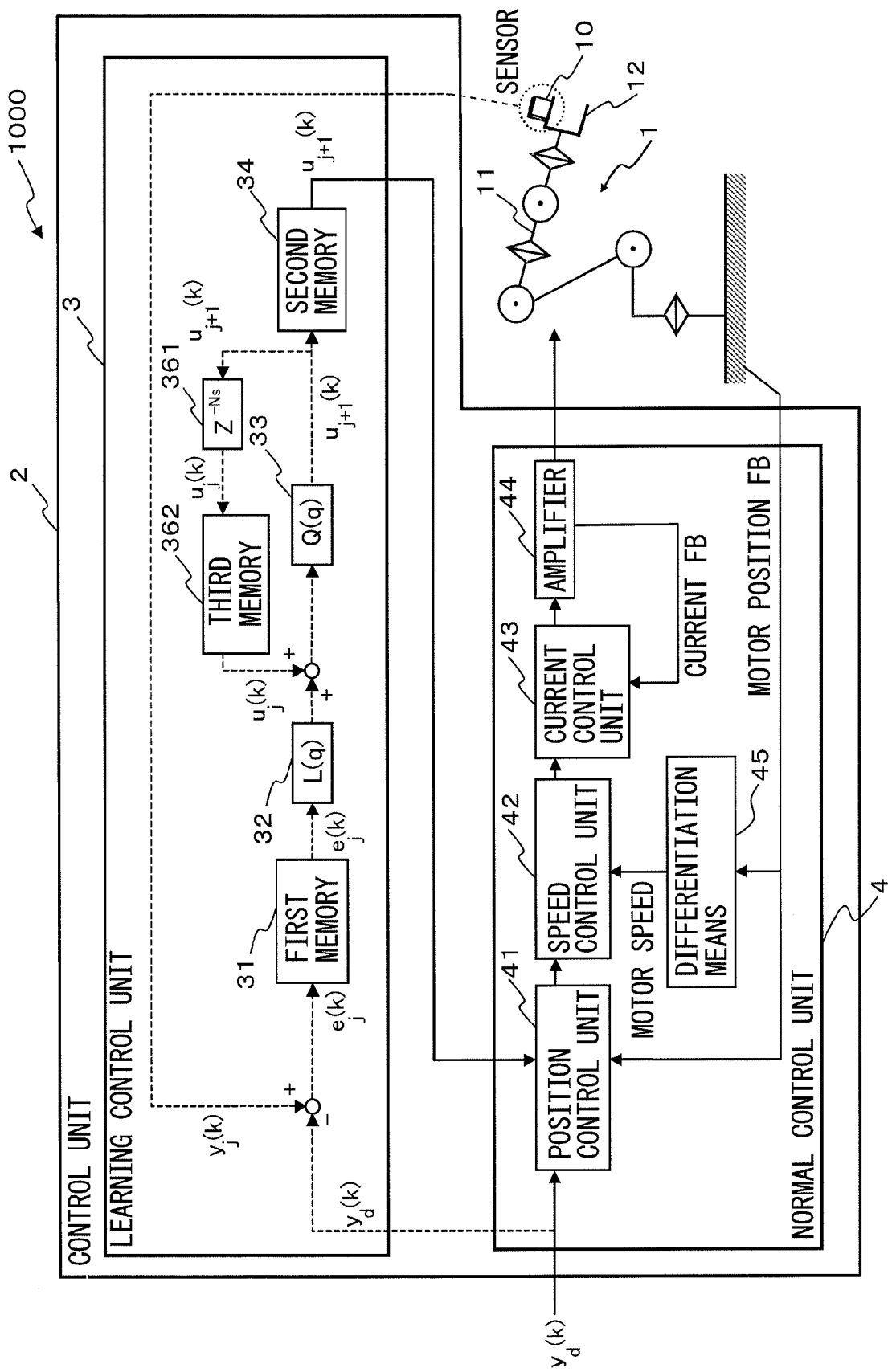
FIG. 1 is a diagram showing a configuration of a conventional robot.

The learning control unit 3 operates the robot mechanism unit according to a speed command which is given by multiplying the teaching speed designated in a task program by a speed change ratio. From a detection result of an acceleration sensor 10, the learning control unit 3 executes learning for calculating a learning correction amount $u_{j+1}(k)$ for making the trajectory or position of the control target of the robot mechanism unit 1 approach closer to the target trajectory or target position that is assigned to the normal control unit 4. Otherwise, the learning control unit 3 executes learning to calculate a learning correction amount $u_{j+1}(k)$ for reducing the vibration of the control target, which is generated when the robot mechanism unit is operated. The robot 100 according to the first embodiment has a feature that the normal control unit 4 performs processes so that the control target position of the robot mechanism unit 1 moves along a fixed trajectory regardless of the speed change ratio. Configurations other than the learning control unit 3 is the same as the configurations of the conventional robot shown in FIG. 1 and therefore will not be explained in detail. In the learning control unit 3, a first memory 31, a position transformer 35, a high-pass filter 36, an inverse transformer IK 37, a forward transformer FK 38, a learning control filter L(q) 32, a low-pass filter Q(q) 33, a second memory 34, a delay circuit 361, a third memory 362 and a fourth memory 39 are provided.

Figure 3B:
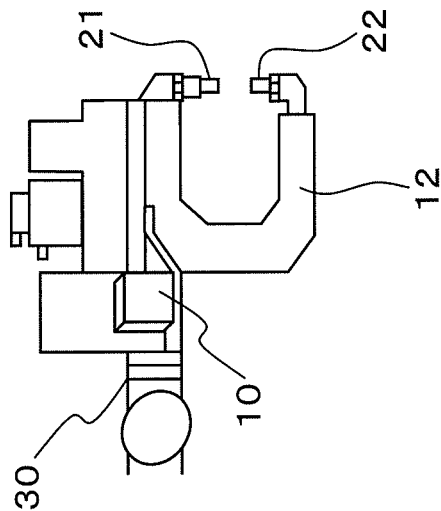
FIG. 3A and FIG. 3B are diagrams showing configurations of a robot mechanism unit and sensor in the robot according to the first embodiment.
Figure 3A:
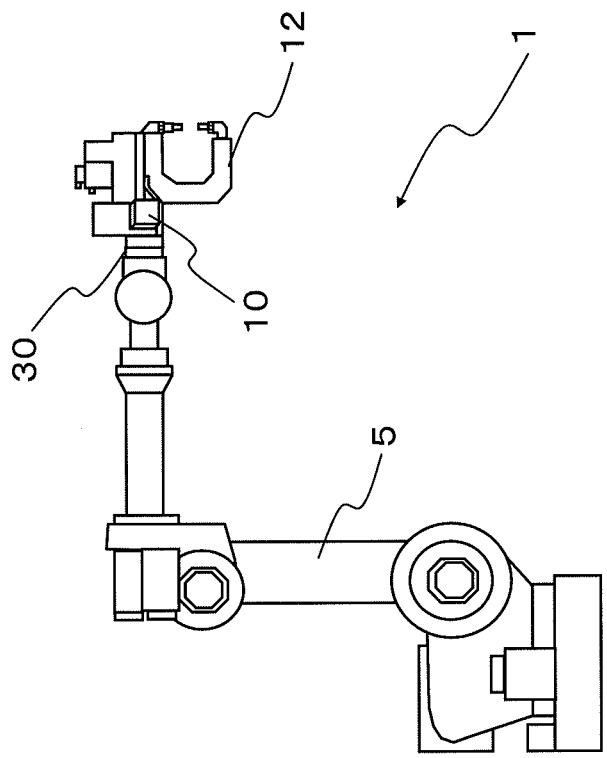

FIG. 3 is a diagram showing a configuration of the robot mechanism unit 1 of the robot 100. FIG. 3A shows an overall configuration of the robot mechanism unit 1, and FIG. 3B shows an enlarged view of a gun 12 having an acceleration sensor 10 mounted thereon. The robot mechanism unit 1 is a well-known robot manipulator. There are no particular limits regarding the mechanism of the robot mechanism unit, as long as the gun 12 can reach the positions and postures in which the gun 12 performs tasks. The acceleration sensor 10 is used as a sensor for detecting the position of the robot mechanism unit 1 and the trajectory/vibration errors which may occur when the robot mechanism unit 1 is decelerated to pause. The acceleration sensor 10 is mounted at the forward end portion of the gun 12, which is the part of the robot mechanism unit that is subject to position control. A tri-axial acceleration sensor may be used as the acceleration sensor 10. The acceleration sensor 10 has a mounting means that is formed with a magnet and can be attached to and detached from the robot mechanism unit 1, and therefore is detachable. The case of the acceleration sensor 10 may be formed with a magnet.

Figure 4:
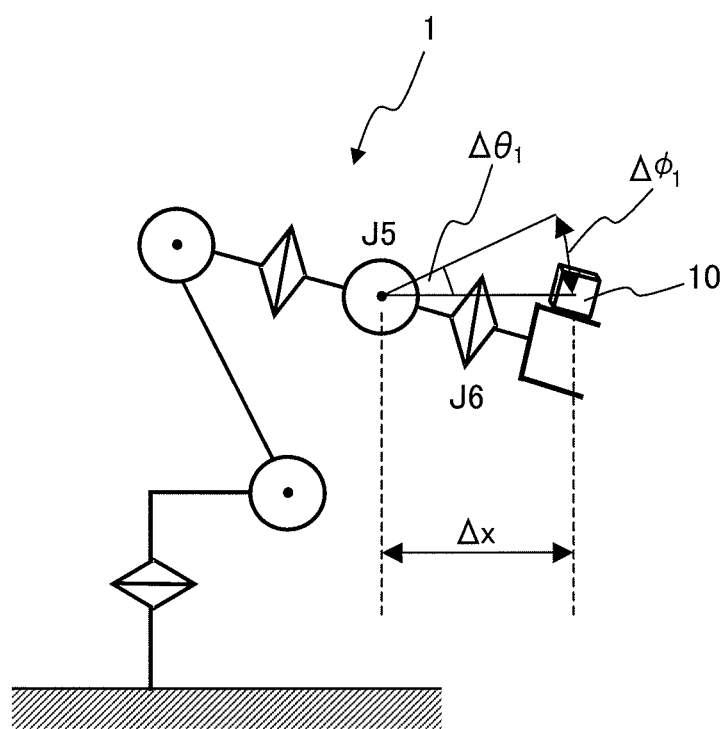
FIG. 4 is a conceptual diagram showing a configuration of the robot mechanism unit in the robot according to the first embodiment.

The calibration of the acceleration sensor 10 attached to the robot mechanism unit 1 of the robot shown in FIG. 3 will be described with reference to FIG. 4.

After mounting the acceleration sensor 10 on the robot mechanism unit 1, the robot mechanism unit 1 is made to perform predetermined operations, and calibration to calculate the position and inclination of the acceleration sensor 10 is performed. Data transform from a tool coordinate system into a world coordinate system is necessary to perform calibration, and this is performed in the following steps.

Figure 5:
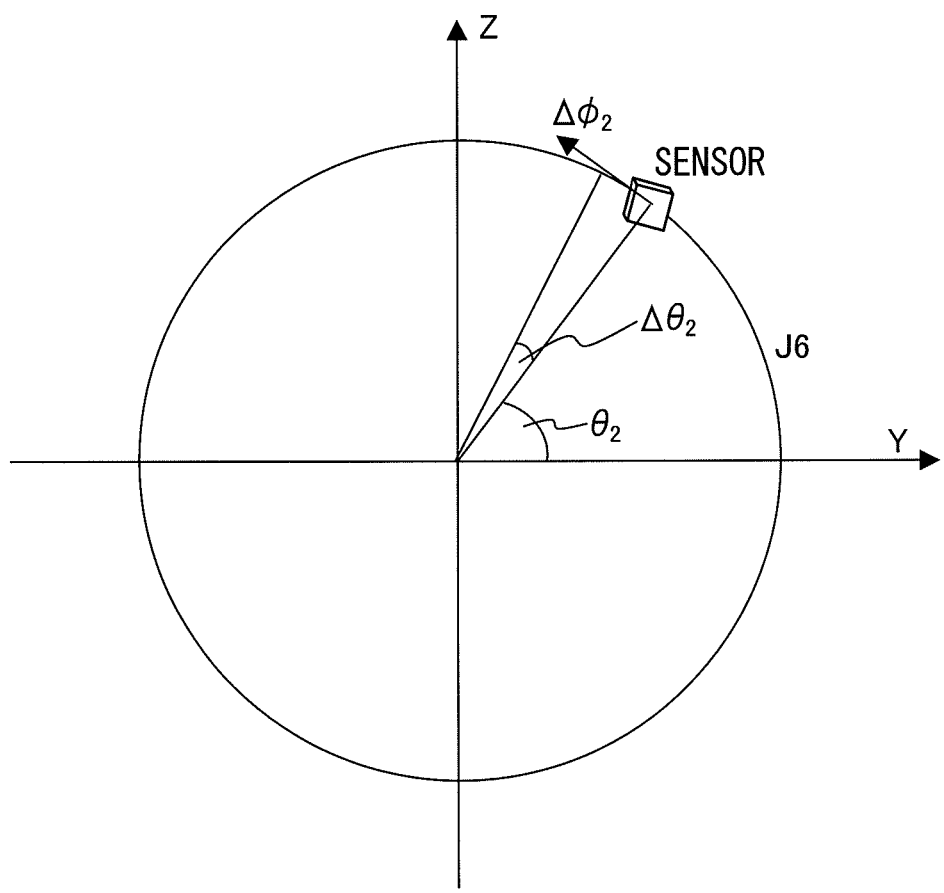
FIG. 5 is a diagram showing the position of a sensor in a world coordinate system.

First, the inclination of the acceleration sensor 10 is specified. As shown in FIG. 5, operation is performed in the X axis direction from a given point $P_0$ (not shown) on a world coordinate system, and acceleration data upon passing through a given point $P_1$ (not shown) is acquired. Then, assume that the acceleration data in a stationary state at point $P_0$ is designated as $a_0$, and the acceleration data at point $P_1$ in an operating state is designated as $a_1$. Then, the acceleration $a_{x\gamma}$ excluding the gravitational acceleration (stationary acceleration) can be expressed as $a_{x\gamma}=a_1-a_0$. By normalization, this can be defined as follows.

$$a_x = \frac{a_{xr}}{|a_{x\gamma}|}$$

Next, operation is performed in the Y axis direction from the point $P_0$, and acceleration data $a_2$ upon passing a given point $P_2$ (not shown) is acquired. In the process, the acceleration $a_{y\gamma}$ excluding the gravitational acceleration can be expressed as $a_{y\gamma}=a_2-a_0$. By normalization, this can be defined as follows.

$$a_y = \frac{a_{yr}}{|a_{y\gamma}|}$$

A vector that is orthogonal to these two is given as $a_{z\gamma}=a_x \times a_y$ and can be expressed as follows.

$$a_z = \frac{a_{z\gamma}}{|a_{z\gamma}|}$$

As a result, the matrix $R_t$ for transforming the posture from the tool coordinate system into the world coordinate system can be expressed as follows.

$$R_t=[a_x\ a_y\ a_z]$$

Next, by operating J5 and J6, the position of the acceleration sensor 10 is specified. First, as shown in FIG. 4, J5 is rotated $\Delta\theta_1$. Then, by multiplying the corresponding acceleration data measured in the coordinate system of the acceleration sensor 10 by the matrix $R_t$ and making the acceleration data having been transformed into the world coordinate system $(\ddot{\phi}_{1x}, \ddot{\phi}_{1y}, \ddot{\phi}_{1z})$ sensor displacement $\Delta\phi_1$ can be expressed as follows.

$$\Delta\phi_1 = \iint \sqrt{\ddot{\phi}^2_{1x} + \ddot{\phi}^2_{1z}}\, dt\, dt$$

The amount of offset $\Delta x$ in the X axis direction in the world coordinate system at that time is expressed as $\Delta x = \Delta\phi_1/\Delta\theta_1$.

Then, as shown in FIG. 5, J6 is rotated $\Delta\theta_2$. Then, by multiplying the corresponding acceleration data measured in the coordinate system of the acceleration sensor by the matrix $R_t$ and making the acceleration data having been transformed into the world coordinate system $(\ddot{\phi}_{2x}, \ddot{\phi}_{2y}, \ddot{\phi}_{2z})$, sensor displacement $\Delta\phi_2$ can be expressed as follows.

$$\Delta\phi_2 = \iint \sqrt{\ddot{\phi}^2_{2y} + \ddot{\phi}^2_{2z}}\, dt\, dt$$

$\gamma = \Delta\phi_2/\Delta\theta_2$ is given, and the amount of offset $\Delta y$ in the Y axis direction in the world coordinate system is calculated as $\Delta y = \gamma \cos\theta_2$, and the amount of offset $\Delta z$ in the Z axis direction in the world coordinate system is calculated as $\Delta z = \gamma \sin\theta_2$.

As described above, by transforming data from the tool coordinate system into the world coordinate system, it is possible to calculate the position and inclination of the acceleration sensor 10 from output data of the acceleration sensor 10, and perform calibration.

Next, the designing of the learning control filter 32 will be explained. First, the frequency response up to a position estimated based on the acceleration sensor 10 is measured from input of the learning correction amount $u_{j+1}(k)$ with respect to each axis. Also, the block of the learning control unit 3 is shown in FIG. 2.

Next, from the frequency response result, a linear matrix inequality is solved. A linear matrix inequality is a problem to calculate x that minimizes $c^T x$ ($c \in R^m$) under the following restraint conditions.

$$F(x) = F_0 + \sum_{i=1}^{m} x_i F_i \geq 0$$

$$(x \in R^m,\ F_i = F_i^* \in R^{n \times n},\ m,\ i \in Z)$$

$F_i$ is a positive semi-definite matrix.

Now, assume that the learning control filter is expressed as $$L(z) = L_0 z^{-N_0} + L_1 z^{-N_0+1} + \ldots + L_{N_0} z^0 + \ldots + L_{2N_0-1} z^{N_0-1} + L_{2N_0} z^{N_0}$$

where $N_0 \in Z$.

Assuming that $$x = [\gamma^2\ L_0\ L_1 \ldots L_{2N_0}]^T$$

$$c^T = [1\ 0\ 0 \ldots 0]$$

where $\gamma \in R$, $L_k \in R^{N_y \times N_u}$, $k \in Z$,
then, the conditions for guaranteeing the stability and monotonic decrease of the learning control filter are expressed as shown below in the frequency domain.

$$\|Q(z)(I - L(z)P(z))\|_\infty = \gamma < 1 \quad (2)$$

In this equation, Q(z) designates a low-pass filter having the learning band as the cut frequency, L(z) designates the learning control filter, and P(z) is the transfer function from the input of the learning correction amount to the control target. L(z) is the notation of the learning control filter in the frequency domain, and, on the other hand, L(q) is the notation of the learning control filter in the time domain. The smaller the value of this $\gamma$, the higher the performance of the learning control filter. The learning control filter optimization problem is a problem to calculate the learning filter L(z) to give the minimum $\gamma$ when a frequency band for learning control is allocated. This equation can be rewritten as follows.

$$\begin{bmatrix} 0 & Q(e^{j\Omega_i})^* \\ Q(e^{j\Omega_i}) & 0 \end{bmatrix} + \gamma^2 \begin{bmatrix} I & 0 \\ 0 & 0 \end{bmatrix} +$$

$$\begin{bmatrix} 0 & (-Q(e^{j\Omega_i})L(e^{j\Omega_i})P(e^{j\Omega_i}))^* \\ (-Q(e^{j\Omega_i})L(e^{j\Omega_i})P(e^{j\Omega_i})) & 0 \end{bmatrix} \geq 0$$

$(\gamma < 1\ \text{for all}\ \Omega_i)$

Assuming that $$\phi_k(z) = z^{-N_0 + (k-1)},$$

then, $$L(e^{j\Omega_i}) = L_0 \phi_0(z)\big|_{z=e^{j\Omega_i}} + \ldots + L_{2N_0} \phi_{2N_0}(z)\big|_{z=e^{j\Omega_i}}$$

$$= \sum_{k=0}^{2N_0} L_k \phi_k(z)\bigg|_{z=e^{j\Omega_i}}$$

is given.

$L_k$ can be expressed by the linearity of $\alpha_{k,j}$ and $V_j$, where $V_j$ is in the same dimension as $L_k$, and is always zero other than the element (j,i). For example, assume that $N_y = 2$ and $N_u = 2$.

$$L_k = \begin{bmatrix} L_{1,1}^k & L_{1,2}^k \\ L_{2,1}^k & L_{2,2}^k \end{bmatrix}$$

$$= L_{1,1}^k \begin{bmatrix} 1 & 0 \\ 0 & 0 \end{bmatrix} + L_{1,2}^k \begin{bmatrix} 0 & 1 \\ 0 & 0 \end{bmatrix} + L_{2,1}^k \begin{bmatrix} 0 & 0 \\ 1 & 0 \end{bmatrix} + L_{2,2}^k \begin{bmatrix} 0 & 0 \\ 0 & 1 \end{bmatrix}$$

$$= \alpha_{k,1} V_1 + \alpha_{k,2} V_2 + \alpha_{k,3} V_3 + \alpha_{k,4} V_4$$

Also, $$Q(e^{j\Omega_i})L(e^{j\Omega_i})P(e^{j\Omega_i}) = Q(e^{j\Omega_i}) \sum_{k=0}^{2N_0} \sum_{j=1}^{N_y N_u} \alpha_{k,j} V_j \phi_k(z)\bigg|_{z=e^{j\Omega_i}} P(e^{j\Omega_i})$$

$$= \sum_{l=1}^{(2N_0+1)N_y N_u} \beta_l F_l^i$$

is given, where $$\beta_l \alpha_{k,j},$$

and $$F_l^i = Q(e^{j\Omega_i}) V_j P(e^{j\Omega_i}).$$

As a result, this equation is rewritten as $$\gamma^2 \begin{bmatrix} I & 0 \\ 0 & 0 \end{bmatrix} +$$

$$\sum_{l=1}^{(2N_0+1)N_yN_u} \beta_l \left[ \begin{matrix} 0 & F_l^i(e^{j\Omega_i})^* \\ F_l^i(e^{j\Omega_i}) & 0 \end{matrix} \right] + \left[ \begin{matrix} 0 & Q(e^{j\Omega_i})^* \\ Q(e^{j\Omega_i}) & 0 \end{matrix} \right] \geq 0$$

Considering the first term and second term of this equation as $\Sigma_{i=1}{}^m x_i F_i$ and the third term as $F_0$, $$c=[1\ 0\ 0\ \ldots\ 0], x=[\gamma^2\ \beta_1\ \beta_2\ \ldots\ \beta_{(2N_0+1)N_yN_u}]$$

is given, and the above equation is expressed as $$\Sigma_{i=1}{}^m x_i F_i + F_0.$$

This is equivalent to the restraint condition of the linear matrix inequality (1). Then, the minimization problem leads to the problem of minimizing $c^T x$, i.e., $\gamma^2$. This can be interpreted as a learning control filter optimization problem. That is to say, by leading to a minimization problem by a linear inequality of a decision-value sign matrix, it is possible to find a solution systematically. Thus, the sufficient condition for stability and monotonic decrease is given as $c^T x \leq 1$. So, by measuring $P(e^{j\Omega i})$ from experiment and giving the learning band filter $Q(z)$, the learning filter $L(z)$ 32 can be determined automatically.

Furthermore, the robustness of the learning control filter is taken into account. A robot has a feature of changing its system significantly with posture.

Assuming that a given posture is determined as a reference posture and $P_n(z)$ is the learning system for the reference posture. Then, an arbitrary posture $P_m(z)$ is expressed as $P_m(z)=P_n(z)+\Delta P_m(z)$, where $\Delta P_m(z)$ is the amount of change of the learning system from the reference posture. In this case, the restraint condition when the learning band filter $Q(z)$ is given is expressed as follows.

$$\gamma_m^2 \left[ \begin{matrix} I & 0 \\ 0 & 0 \end{matrix} \right] +$$

$$\sum_{l=1}^{(2N_0+1)N_yN_u} \beta_l \left[ \begin{matrix} 0 & F_{l,m}^i(e^{j\Omega_i})^* \\ F_{l,m}^i(e^{j\Omega_i}) & 0 \end{matrix} \right] + \left[ \begin{matrix} 0 & Q(e^{j\Omega_i})^* \\ Q(e^{j\Omega_i}) & 0 \end{matrix} \right] \geq 0$$

Considering $x_m=[\gamma_m^2\ \beta_{1,m}\ \beta_{2,m}\ \ldots\ \beta_{(2N_0+1)N_yN_u,m}]$, the sufficient condition for the stability condition and monotonic decrease is met by satisfying the following condition for an arbitrary integer m.

$$c^T x_m \leq 1$$

Following the above steps, by measuring experimentally $P(e^{j\Omega i})$ for m postures, it is possible to determine the learning control filter automatically as in the preceding case.

Next, the data processing steps in the learning control unit will be explained.

As shown in FIG. 2, feedback is established from three loops, namely position control, speed control and current control, and the learning control forms a loop outside the feedback position control loop. Parts designated by solid lines form an effective loop during in the learning operating state, and, after stop of the learning operation, the loop indicated by dotted lines becomes effective. $a_j$ designates data obtained from the acceleration sensor 10, and the position transformer 35 transforms the acceleration data $a_j$ into position data. During learning, the data on the vibration which occurs when the robot mechanism unit 1 is paused and which is detected by the acceleration sensor 10, is saved in the first memory 31. The learning correction amount $u_{j+1}(k)$ is output from the second memory 34.

After completion of the operation, the position transformer 35 estimates the trajectory/vibration errors of the orthogonal coordinates, and, by using the high-pass filter 36, which is a zero-phase high-pass filter, the trajectory/vibration error $\Delta r$ from which offset is removed, is extracted. This trajectory/vibration error is added to the position data r of the acceleration sensor 10, which is estimated from motor position feedback (FB) data using FK 38, and, by this means, the sensor position of the acceleration sensor 10 in the orthogonal coordinate system including the dynamics of the arm, is estimated.

Next, by inverse-transforming the sensor position estimated from the detected data of the acceleration sensor 10 into the three basic axes, the position on each axis including arm dynamics, that is, position vibration components, is calculated. From this position on each axis including arm dynamics, the position on each axis not including arm dynamics, that is, the motor position, is subtracted, to calculate the target correction amount on each axis. In the equation shown below, $\psi_j$ designates the target correction amount on each axis for the j-th trial, IK designates inverse transformation, and $\theta_{mj}$ designates the motor position on each axis in the j-th trial.

$$\psi_j = IK^{-1}(r+\Delta r) - \theta_{mj}$$

By inputting this target correction amount for each axis into the learning control filter, the correction amount $u_{j+1}(k)$ for the next trial is calculated. Through the learning control filter L(q) 32, the learning correction amount $u_j$ for the preceding trial is added from the third memory 362, and the learning correction amount $u_{j+1}$ for the next trial is calculated through the low-pass filter Q(q) 33.

As described above, through the data processing steps in the learning control unit 3, it is possible to find the learning correction amount $u_{j+1}$.

Next, the steps of increasing the operation speed of the robot mechanism unit 1 in learning control will be explained with reference to FIG. 6.

Figure 6:
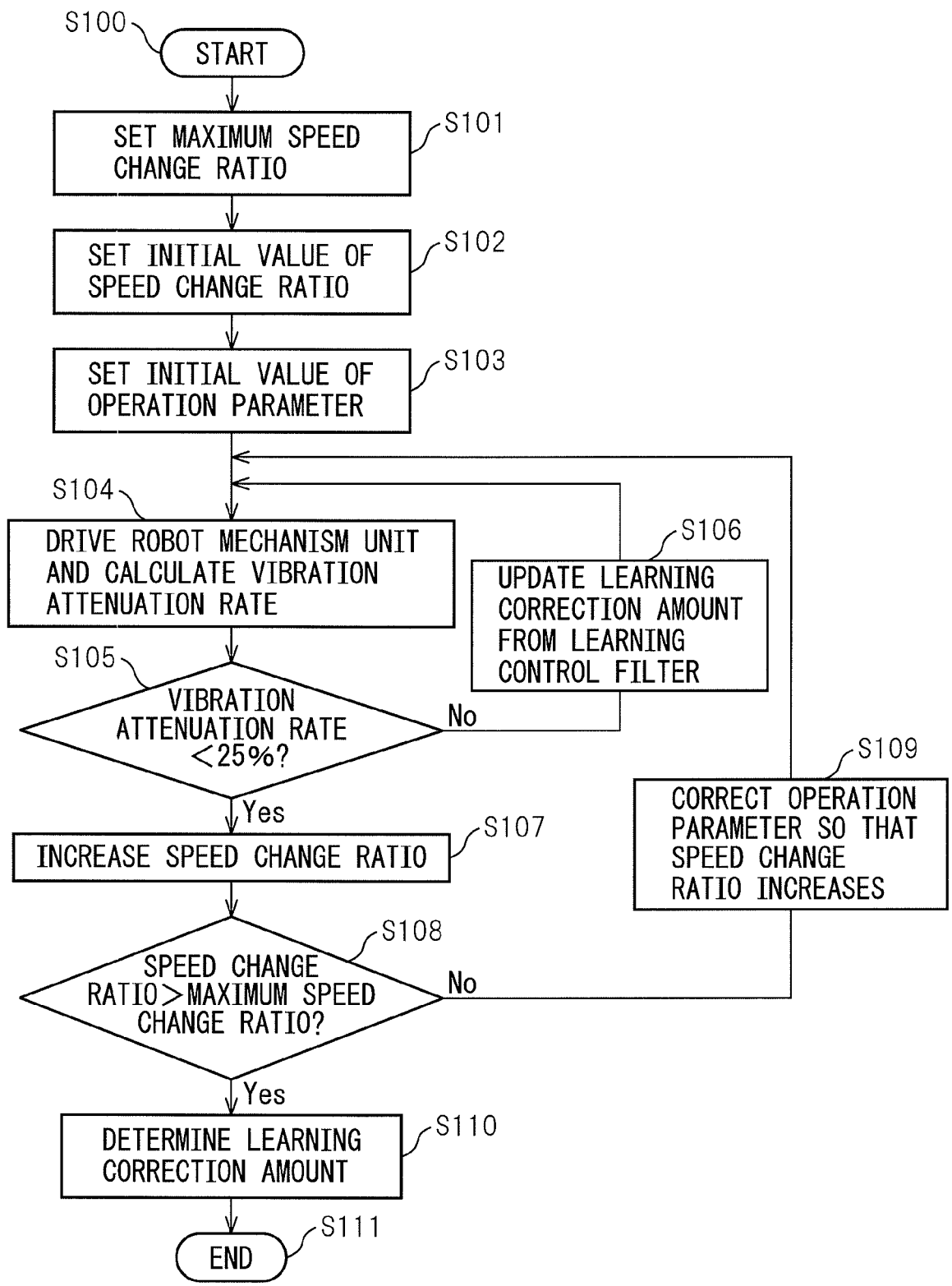
FIG. 6 is a flowchart for explaining the steps of increasing the speed of operation of the robot mechanism unit forming the robot according to the first embodiment.

FIG. 6 is a flowchart for explaining the steps of increasing the operation speed of the robot mechanism unit. To increase the operation speed of the robot mechanism unit 1, the learning control unit 3 calculates the maximum speed change ratio (hereinafter also referred to as "maximum speed override") that can be set while learning is in progress, and executes learning to calculate a learning correction amount $u_{j+1}(k)$ while changing the speed change ratio over a plurality of times until reaching a predetermined maximum speed change ratio. Upon execution of a program, the speed given by multiplying the teaching speed by the speed change ratio serves as the operation speed. This technique of processing the speed change ratio is the same as the technique of processing the speed override.

First, in step S101, the learning control unit 3 sets the maximum speed change ratio that can be set while learning is in progress. The maximum speed change ratio is calculated by the learning control unit 3, based on data acquired when the robot mechanism unit is operated, the maximum speed and maximum acceleration that can be tolerated in the robot mechanism unit, or the desired duration of life of the decelerator. First, the robot mechanism unit is operated once, and, from the data of the first trial, the maximum speed change ratio that is determined from the maximum acceleration which can be learned for each axis, the maximum speed change ratio that is determined from the maximum speed, and the maximum speed change ratio that is determined from the duration of life of the decelerator, are calculated.

First, the maximum speed change ratio that can be learned for each axial motor is calculated from the viewpoint of the maximum acceleration. The equation of motion of the robot is defined as follows.

$$\tau = M(\Theta)\ddot{\Theta} + V(\Theta,\dot{\Theta}) + G(\Theta)$$

(where $\Theta$ is the position of the arm and $\dot{\Theta}$ is the speed).

$M(\Theta)$ is a matrix of the inertial term, $V(\Theta,\dot{\Theta})$ is a vector of the speed term, and $G(\Theta)$ is a vector of the gravity term. A part where a great amount of torque is used is mainly a situation of acceleration or deceleration. Assuming that the torque increase due to the increase in the speed override is mainly caused from $M(\Theta)\ddot{\Theta}$, an approximate value of the maximum speed override $\text{ovr\_max}_{1,i}$ is calculated from the viewpoint of acceleration and deceleration.

Assuming that the maximum torque for the first trial is $\tau_{max,i}$, the maximum torque tolerance of the motor is $\tau_{p,i}$ and the torque $M(\Theta)\ddot{\Theta}$ used for acceleration and deceleration is $\tau_{a,i}$, the equation below is obtained.

$$\tau_{a,i} = \tau_{max,i} - (V(\Theta,\dot{\Theta}) + G(\Theta))_i$$

In the case the maximum speed ratio is determined without actual operation (for example, offline), it is possible to use a maximum torque command instead of the maximum torque for the first trial.

In this case, considering the $\text{ovr\_max}_{1,i}$ is proportional to the square of $\tau_{a,i}$, the following is given.

$$\text{ovr\_max}_{1,i} = \sqrt{\frac{\tau_{p,i} - (V(\Theta,\dot{\Theta}) + G(\Theta))_i}{\tau_{a,i}}}$$

where the affix i indicates the i-th axis.

In the manner described above, the maximum override $\text{ovr\_max}_{1,i}$ is obtained from the viewpoint of the maximum acceleration.

Next, the maximum speed override $\text{ovr\_max}_{2,i}$ is calculated from the viewpoint of the maximum speed. Assuming that the maximum speed for the first trial is $\omega_{v,i}$ and the maximum speed tolerance of the motor is $\omega_{p,i}$, $$\text{ovr\_max}_{2,i} = \frac{\omega_{p,i}}{\omega_{v,i}}$$

is obtained. When the maximum speed ratio is determined without actual operation (for example, offline), it is possible to use a maximum speed command instead of the maximum speed for the first trial.

As described above, the maximum speed change ratio $\text{ovr\_max}_{2,i}$ is obtained from the viewpoint of the maximum speed.

Next, from the viewpoint of the duration of life of the decelerator, the maximum speed change ratio $\text{ovr\_max}_{3,i}$ is calculated. Assuming that the estimated duration of life of the decelerator is $L_h$ [hour], $L_h$ can be expressed in the following equation. In this embodiment, the maximum speed change ratio $\text{ovr\_max}_{3,i}$ is determined using the following equation.

$$L_h = K \times \frac{\omega_t}{\omega_{av}} \times \left(\frac{\tau_t}{\tau_{av}}\right)^{10/3}$$

Note that K is the rated life [hour], $\omega_t$ is the rated speed [rpm], $\omega_{av}$ is the average speed [rpm], $\tau_t$ is the rated torque [Nm], and $\tau_{av}$ is the average torque [Nm]. Also, the coefficient 10/3 is a coefficient to depend on the type of the decelerator. The average speed $\omega_{av}$ is defined as follows.

$$\omega_{av} = \Delta t \sum_j^n \omega_j(j\Delta t)$$

Note that $\omega_j(t)$ is the motor axis speed, j is an integer, and $\Delta t$ is the sampling time. The average torque $\tau_{av}$ is expressed by the following equation.

$$\tau_{av} = \sqrt[\frac{10}{3}]{\frac{\sum_j^n \omega_j^{\frac{10}{3}}}{\sum_j^n \omega_j}}$$

When the maximum speed ratio is determined without actual operation (for example, offline), it is possible to use a maximum speed command instead of the maximum speed for the first trial.

Next, the method of calculating the maximum speed change ratio $\text{ovr\_max}_{3,i}$ will be explained. In the initial operation, the speed change ratio ovr is set as follows.

$$\text{ovr} = \text{ovr\_ini}$$

(where, $\text{ovr\_ini} = 100$)

Also, the motor axis speed then is defined as $\omega_{int,j}(j\Delta t)$. The estimated duration of life of the decelerator then is expressed by the following equation.

$$L_{ini,h} = K \times \frac{\omega_t}{\omega_{ini,av}} \times \left(\frac{\tau_t}{\tau_{ini,av}}\right)^{10/3}$$

When the maximum speed ratio is determined without actual operation (for example, offline), it is possible to use a motor axis speed command instead of the motor axis speed for the first trial.

The average speed $\omega_{int,av}$ is expressed by the following equation.

$$\omega_{ini,av} = \Delta t \sum_j^n \omega_{ini,j}(j\Delta t)$$

The average torque $\tau_{av}$ is expressed by the following equation.

$$\tau_{av} = \sqrt[\frac{10}{3}]{\frac{\sum_j^n \omega_{ini,j}^{\frac{10}{3}}}{\sum_j^n \omega_{ini,j}}}$$

If the condition $L_{int,j} \geq L_d$ is met, further acceleration is possible. If this condition is not met, further acceleration is not possible. In the case the above condition is met, ovr is accumulated as follows.

$$\text{ovr} = \text{ovr\_ini} + k \times \Delta \text{ovr}$$

Note that k is the number of times ovr is increased for optimization. The motor axis speed $\omega_j(j\Delta t)$ then can be expressed as follows.

$$\omega_j(j\Delta t) = \frac{ovr}{100}\omega_0\left(j\Delta t\frac{100}{ovr}\right)$$

The average speed $\omega_{av}$ is expressed by the following equation.

$$\omega_{av} = \frac{ovr}{100}\Delta t\sum_j^n \omega_0(j\Delta t) = \frac{ovr}{100}\omega_{ini,j}(j\Delta t)$$

The average torque $\tau_{av}$ is expressed by the following equation.

$$\tau_{av} = \sqrt[\frac{10}{3}]{\frac{\sum_j^n \omega_j^{\frac{10}{3}}}{\sum_j^n \omega_j}} = \sqrt[\frac{70}{9}]{\frac{ovr}{100}} \sqrt[\frac{10}{3}]{\frac{\sum_j^n \omega_{ini,j}^{\frac{10}{3}}}{\sum_j^n \omega_{ini,j}}}$$

Consequently, the estimated duration of life $L_{h,k}$ of the decelerator then is expressed by the following equation.

$$L_{h,k} = K \times \frac{\omega_t}{\omega_{ini,av}} \times \left(\frac{\tau_t}{\tau_{ini,av}}\right)^{10/3}$$

Assuming that the maximum k to satisfy $L_{h,k} \geq L_d$ as $k_{max}$, ovr_max$_{3,j}$ is expressed as follows using $k_{max}$.

ovr_max$_{3,i}$=ovr_ini+$k_{max}$×$\Delta$ovr

Having calculated the above three values, the minimum value among these is defined as the maximum speed change ratio that can be used in learning control. Expressing this as ovr_max, $$\text{ovr\_max} = \max_i\{\text{ovr\_max}_{1,i}, \text{ovr\_max}_{2,i}, \text{ovr\_max}_{3,i}\}$$

is given.

After setting maximum speed change ratio in step S101 as described above, in step S102, the speed control unit 42 sets the initial value of the speed change ratio. For example, the speed control unit 42 sets the initial value at 10%.

Next, in step S103, the current control unit 43 sets the initial values of operation parameters for operating the robot mechanism unit according to the initial value of the set speed change ratio.

Next, in step S104, the robot mechanism unit is operated according to the set operation parameters, and, based on a signal from the acceleration sensor 10, the learning control unit 3 calculates the vibration attenuation rate. The vibration attenuation rate can be determined from γ that is calculated in the equation (2).

Next, in step S105, the position control unit 41 checks whether or not the vibration attenuation rate is lower than a certain level (for example, 25%).

Next, in the case the vibration attenuation rate is 25% or higher, it is determined that vibration has not attenuated enough, and, in step S106, the position control unit 41 updates the learning correction amount $u_{j+1}(k)$ from the learning control filter.

In the case that the vibration attenuation rate is lower than 25%, in step S107, the speed control unit 42 increases the speed change ratio. For example, the speed change ratio is increased from 10% to 20%.

Next, in step S108, the speed control unit 42 determines whether or not the set speed change ratio exceeds the maximum speed change ratio.

In step S108, in the case the set speed change ratio does not exceed the maximum speed change ratio, in step S109, the current control unit 43 modifies the operation parameters so that the speed change ratio increases. For example, the operation parameters are set so that the operation is performed at a speed change ratio of 20%. After that, by repeating steps S104 to S106, a learning correction amount $u_{j+1}(k)$ to make the vibration attenuation rate less than 25% is calculated.

In this way, according to the present embodiment, learning is executed while increasing the speed change ratio up to the maximum speed change ratio over, for example, a plurality of steps (n steps), and the learning correction amount $u_{j+1}(k)$ is calculated. Assuming that the amount of the speed change ratio to increase in one step is $\Delta$, the number of steps n to increase the speed change ratio can be expressed as follows using $\Delta$.

$$n = \text{ceiling}\left(\frac{\text{ovr\_max} - \text{ovr\_cur}}{\Delta}\right)$$

Where, ovr_cur is the speed change ratio that is set first.

In step S108, in the case the set speed change ratio exceeds the maximum speed change ratio, in step S110, the learning control unit 3 determines the learning correction amount $u_{j+1}(k)$ as the learning correction amount $u_{j+1}(k)$ for the maximum speed change ratio, and the learning control unit 3 stores the learning correction amount $u_{j+1}(k)$ in an F-ROM or in a memory card (MC).

In this way, by repeating a process of increasing the speed change ratio and a learning process until the speed change ratio reaches the maximum speed change ratio, the operation speed is increased. In actual operation, the normal control unit 4 calls and reproduces the learning correction amount $u_{j+1}(k)$ from the F-ROM or memory card (MC).

Figure 7A:
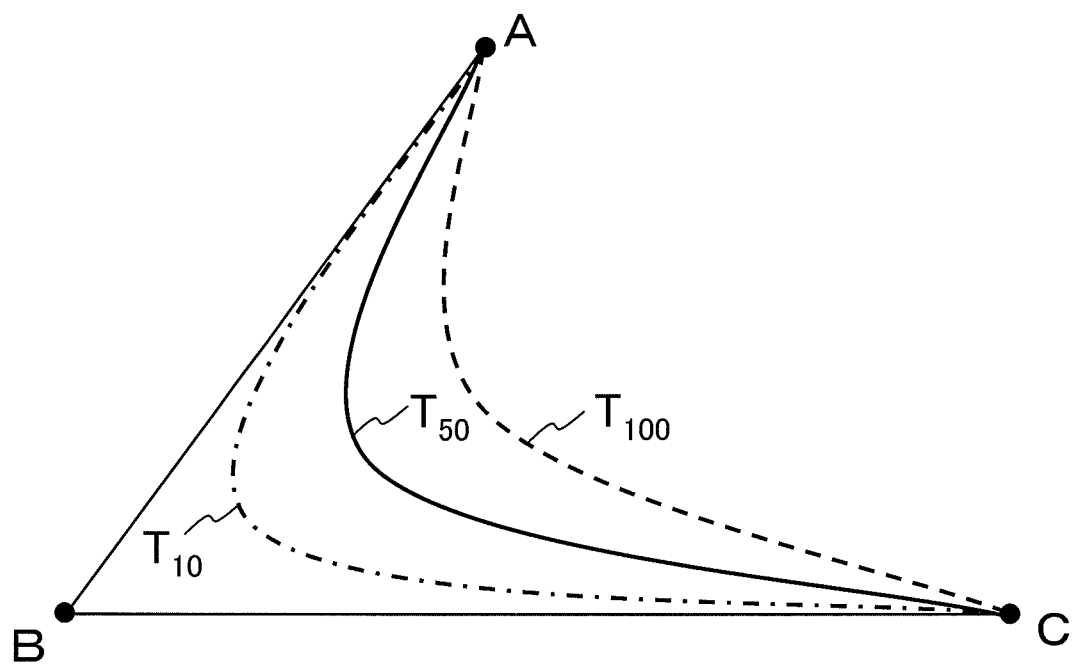
FIG. 7A and FIG. 7B are diagrams for explaining operation following a fixed trajectory.
Figure 7B:
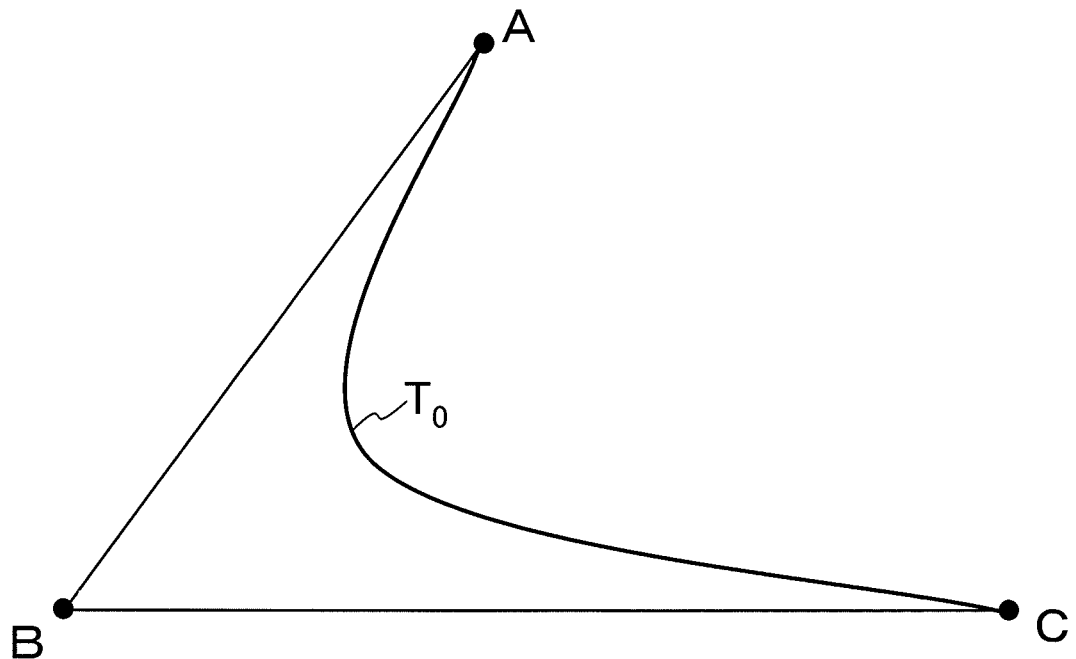

The normal control unit 4 of the robot 100 has a feature of making the robot mechanism unit 1 operate on a fixed trajectory. Operation on a fixed trajectory refers to, when operating the control target position of the robot mechanism unit 1 (i.e., the forward end portion) from the initial position to a desired position according to varying speed change ratios, making the control target position of the robot mechanism unit 1 operate to draw a fixed trajectory regardless of the magnitude of the speed change ratio. Consequently, the normal control unit 4 performs processes so that the control target position in the robot mechanism unit 1 moves along a fixed trajectory regardless of the speed change ratio. For example, as illustrated in FIG. 7A, when the trajectory is not fixed, if the control target position of the robot mechanism unit 1 is operated from the starting point A to end point C, at speed change ratios of 10, 50 and 100%, different trajectories T10, T50 and T100 are drawn. By contrast with this, when the trajectory is fixed, even if the control target position of the robot mechanism unit 1 is operated from the starting point A to the end point C, at speed change ratios of 10, 50 and 100%, the same trajectory $T_0$ is drawn as illustrated in FIG. 7B. In the present embodiment, by operating the control target position of the robot mechanism unit to follow a fixed trajectory, the trajectory does not drift due to change of the speed change ratio, so that it is possible to improve the accuracy and safety of operation of the robot mechanism unit.

As described above, according to the steps of increasing speed illustrated in FIG. 6, a learning correction amount is calculated by repeating learning until the vibration converges within a predetermined range, while gradually increasing the speed change ratio over a plurality of times, so as to allow the control target position of the robot mechanism unit to move along a fixed trajectory regardless of the speed change ratio, so that it is possible to efficiently calculate a learning correction amount that can reduce the vibration.

Also, as with the present embodiment, by fixing the trajectory, the robot 100 is able to enter mass-produced operation soon after the increase of speed is complete.

That is to say, in the case speed is increased without fixing the trajectory as in normal cases, change of the trajectory makes it necessary to check interference against obstacles, and, when there is interference, the program before increase of speed needs to be changed and adjusted so that no interference is caused when speed is increased. In contrast to this, by fixing the trajectory as with the present embodiment, it is possible to omit such checking.

Figure 8:
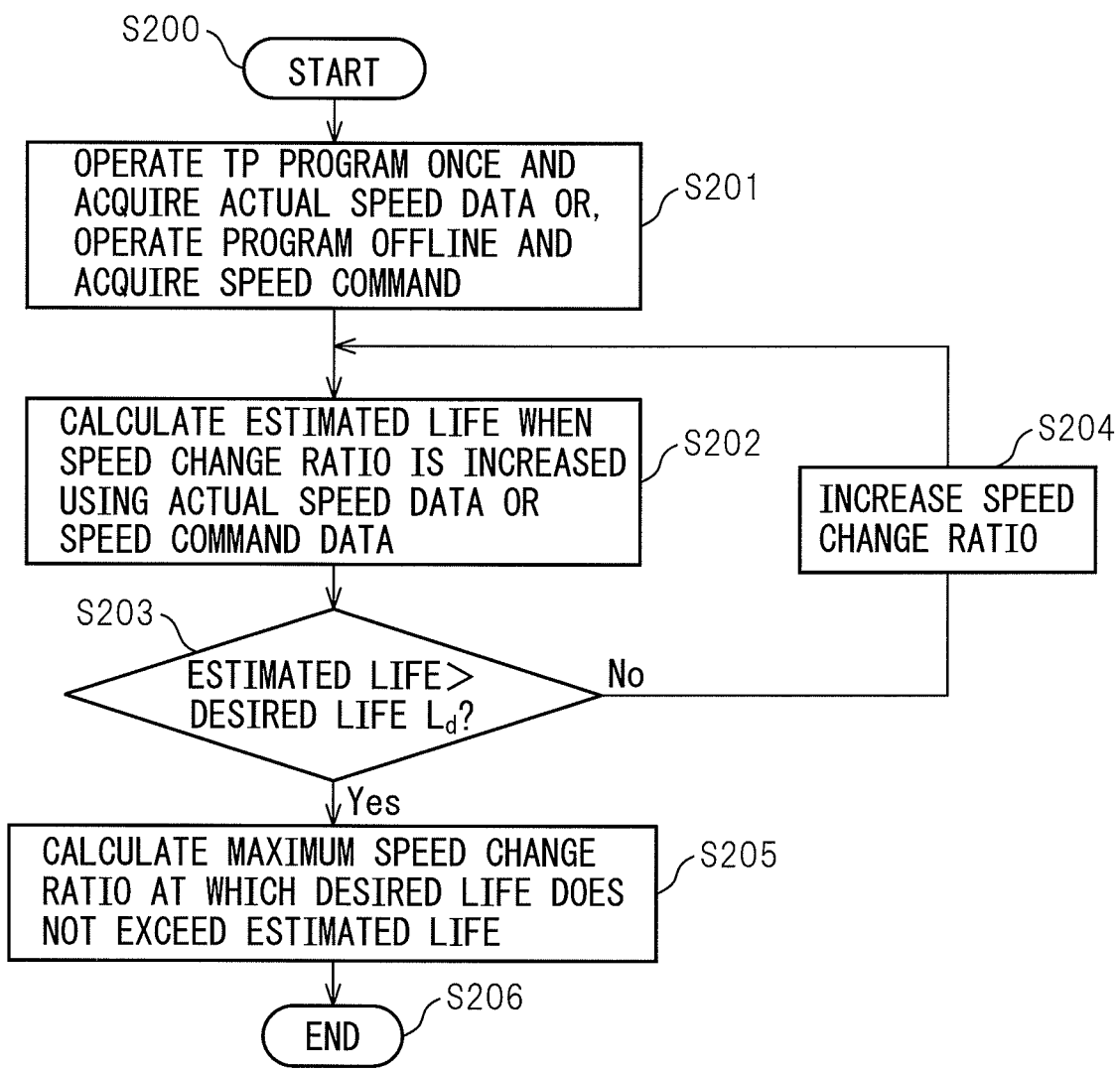
FIG. 8 is a flowchart showing the step of finding a maximum speed change ratio based on the duration of life of a decelerator.

Next, the steps of finding the maximum speed change ratio based on the duration of life of the decelerator will be explained in detail with reference to the flowchart of FIG. 8. First, in step S201, the transport control (Transports and Programs; TP) program is operated once, and actual speed data is acquired. Otherwise, TP program as operated on offline to obtain speed command. Next, in step S202, using the actual speed data or speed command date, an estimated duration of life upon increasing the speed change ratio is calculated. Next, in step S203, whether or not that the estimated duration of life is greater than the desired duration of life $L_d$ is checked. If the estimated duration of life is not greater than the desired duration of life $L_d$, in step S204, the speed change ratio is increased again, and, in step S202, an estimated duration of life is calculated. By repeating the above processes, in step S205, a maximum speed change ratio ovr_max$_{3,i}$ at which the required duration of life does not exceed the estimated duration of life is calculated. By this means, the maximum speed change ratio is determined based on the duration of life of the decelerator.

Although an example has been shown with the above description where, by operating the robot mechanism unit 1, a predetermined maximum speed change ratio is calculated by the learning control unit 3 based on the maximum speed and maximum acceleration that can be tolerated in the robot mechanism unit 1, and the duration of life of the decelerator, it is equally possible to set a predetermined maximum speed change ratio in the control unit 2 from outside.

As described above, in the present embodiment, a zero-phase high pass filter is used as a high-pass filter. Now, the reason to use a zero-phase high-pass filter will be described below.

To use data related to acceleration detected by an acceleration sensor as position vibration data, it is necessary to remove offset. To remove offset, it is necessary to use a high-pass filter that cancels low-frequency data of 2-3 [Hz] or below. However, a high-pass filter has a shortcoming of moving the phase by 0.1 times to 10 times the cut frequency. When the phase drifts, data of the actual vibration is not acquired, and the performance of learning control is severely deteriorated. This is because learning control functions to correct a phase that is different from the actual phase. Then, if a high-pass filter that does not shift the phase can be used, it is possible to improve performance. A zero-phase filter has a feature of being able to hold the characteristics of a time waveform having been subjected to filter processing in the place where the waveform not having been subjected to filter processing appears, so that, with the present embodiment, a zero-phase filter that does not cause shift of phase is used.

Figure 9B:
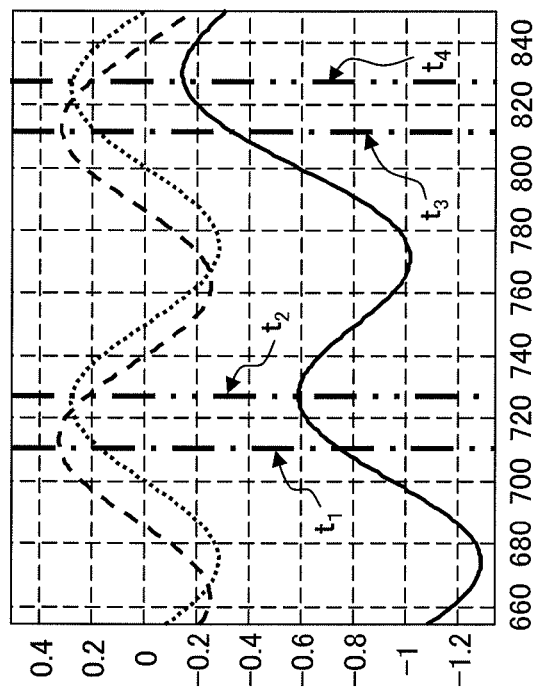
FIG. 9A and FIG. 9B are diagrams for explaining the effect of a zero-phase high-pass filter.
Figure 9A:
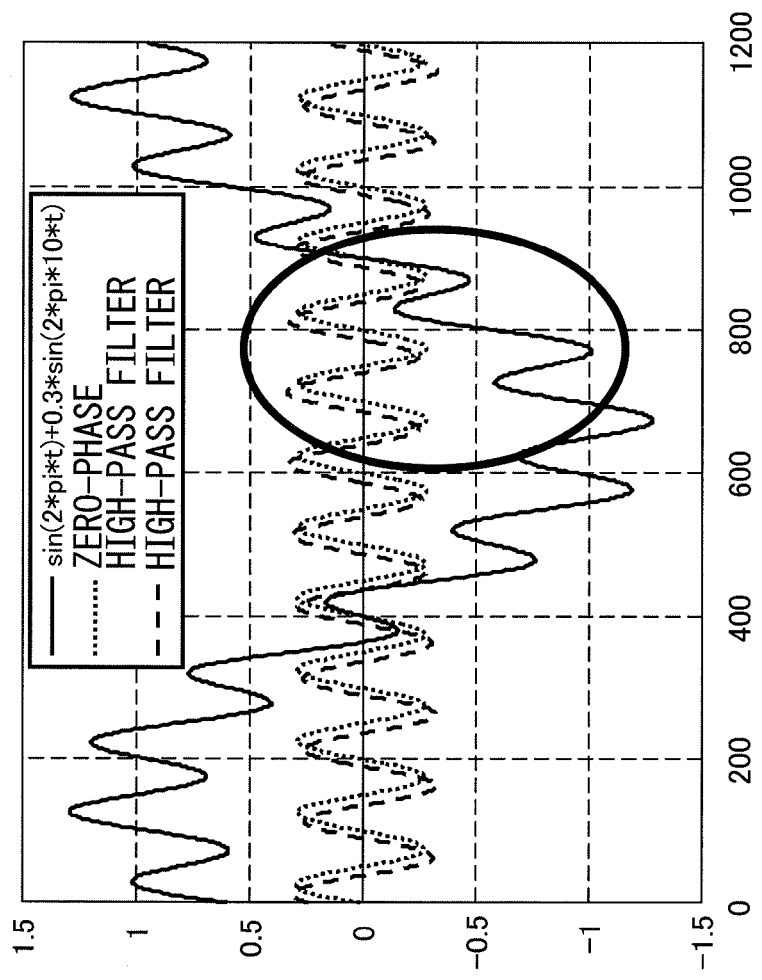

Effects of a zero-phase high-pass filter will be explained with reference to FIG. 9. FIG. 9A shows an original signal represented by the solid line, in which a signal of a period of 1 [Hz] and a signal of a period of 10 [Hz] are mixed, a 10 [Hz] signal (broken line) having passed a normal high-pass filter, and a 10 [Hz] signal (dotted line) having passed a zero-phase high-pass filter. FIG. 9B shows an enlarged view of the elliptic part in FIG. 9A. As illustrated in FIG. 9B, the original signal and the 10 [Hz] signal having passed a zero-phase high-pass filter show their peaks at times $t_2$ and $t_4$, whereas the 10 [Hz] signal having passed a normal high-pass filter shows its peaks at times $t_1$ and $t_3$. From this, it is clear that, while the phase of the original signal is shifted by a normal high-pass filter, when the original signal passes a zero-phase high-pass filter, its phase matches with the original signal. Thus, by using a zero-phase high-pass filter, it is possible to suppress phase lag. Therefore, in the present embodiment, a zero-phase high-pass filter is used.

Next, the steps of data processing in the zero-phase filter will be described with reference to FIG. 10. After acquiring data $d_1$ by applying a high-pass filer to the original data $d_0$ that is arranged in order from 1 to N in a time sequence order, the time sequence is inverse-transformed and rearranged in the order from N to 1, thereby providing data $d_2$. Next, after acquiring data $d_3$ by applying a high-pass filter to data $d_2$, the time sequence is inverse-transformed again into the order from 1 to N, thereby providing data $d_4$. If the processes from data $d_2$ to data $d_4$ are expressed as $H(z^{-1})$, the zero-phase filter is expressed as $H(z)H(z^{-1})$ using a low-pass (or high-pass) filter $H(z)$. As described above, since data is rearranged by inverse-transforming a time sequence, this process can be performed only offline. However, in the present embodiment, acceleration data is acquired during the operation of the robot mechanism unit, so that, by performing offline processing after the operation is finished, it is possible to use a zero-phase high-pass filter that does not shift phase.

Second Embodiment

Figure 11:
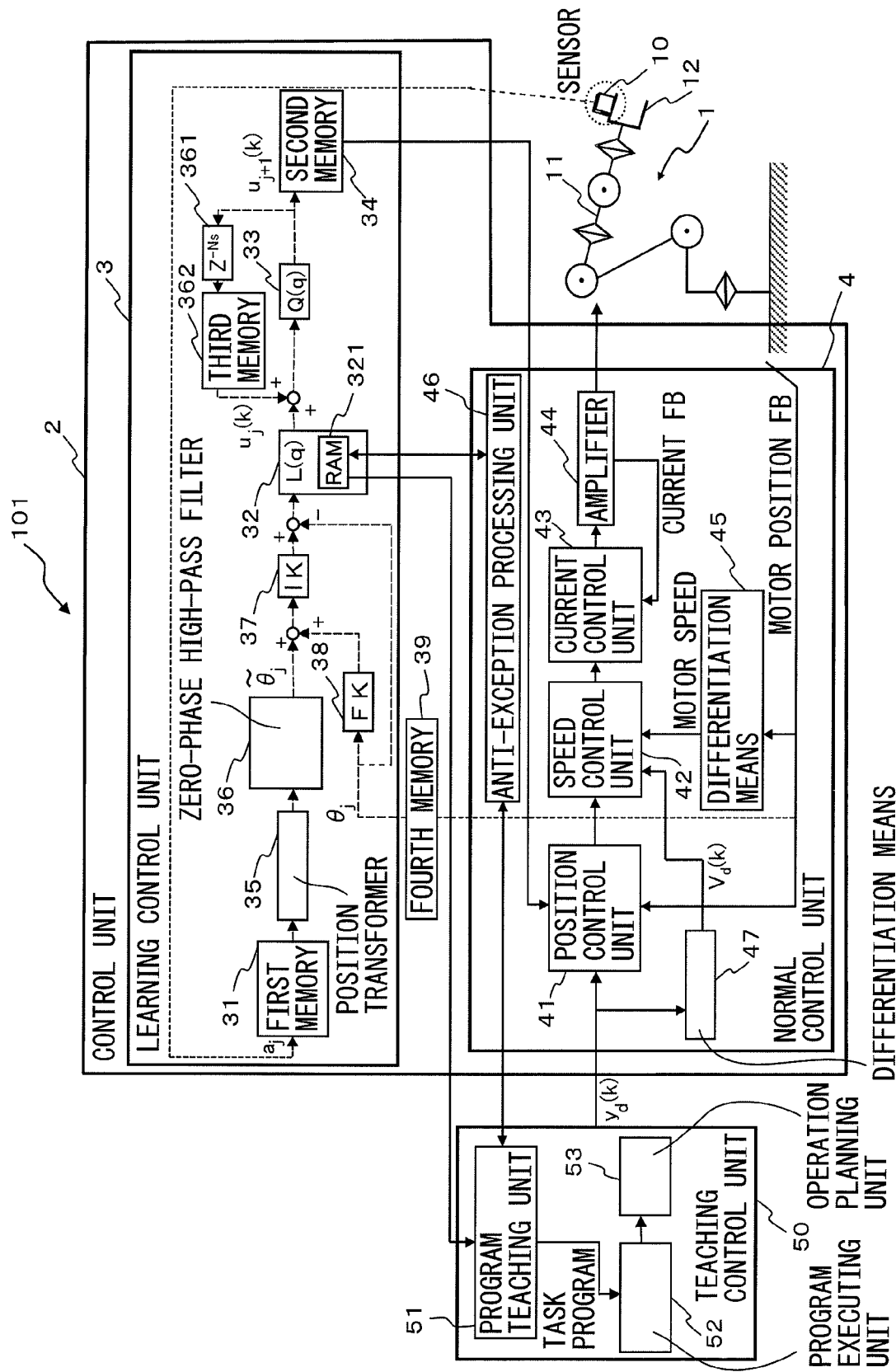
FIG. 11 is a diagram showing a configuration of a robot according to a second embodiment.

Next, a robot according to a second embodiment will be described. FIG. 11 shows a schematic view of the robot according to the second embodiment. In addition to the robot 100 according to the first embodiment, a robot 101 according to the second embodiment has a feature of further having a teaching control unit 50 which includes a program teaching unit 51 that stores a task program, a program executing unit 52, and an operation planning unit 53. The teaching control unit 50 teaches or corrects the position or speed in a task program.

Also, the normal control unit 4 of the robot 101 according to the second embodiment further has an anti-exception processing unit 46. This anti-exception processing unit 46 operates the robot mechanism unit 1 according to a position command based on a teaching position that is set in a task program, a learning correction amount $u_{j+1}(k)$ that is calculated in the learning control unit 3, and a speed command that is given by multiplying a teaching speed that is set in a task program by the speed change ratio used when calculating the learning correction amount $u_{j+1}(k)$. After the learning correction amount $u_{j+1}(k)$ is calculated by the learning control unit 3, when the position of the teaching point is corrected by the teaching control unit 50, if the distance between the teaching point after the position correction and the teaching point before the position correction equals or exceeds a predetermined distance, the anti-exception processing unit 46 controls the move to the teaching point according to the teaching speed, and, if the distance between the teaching point after the position correction and the teaching point before the position correction is less than a predetermined distance, controls the move to the teaching point according to a speed command.

Operation that have been learned are reproduced in high speed operations using the learning correction amount $u_{j+1}(k)$ that is stored in the RAM 321 in the learning control filter 32. However, when an operation as learned is changed significantly, the learning correction amount $u_{j+1}(k)$ becomes inapplicable, and high-speed operation is not possible. Whether or not an operation is changed is recorded in the RAM 321, and can be judged by comparing the operation position $y_d(k)$ that is calculated from the operation position, speed command and the operation plan, and the speed command $V_d(k)$. When an operation is changed, the operation is executed in exception processing (that is, at a teaching speed).

Figure 12:
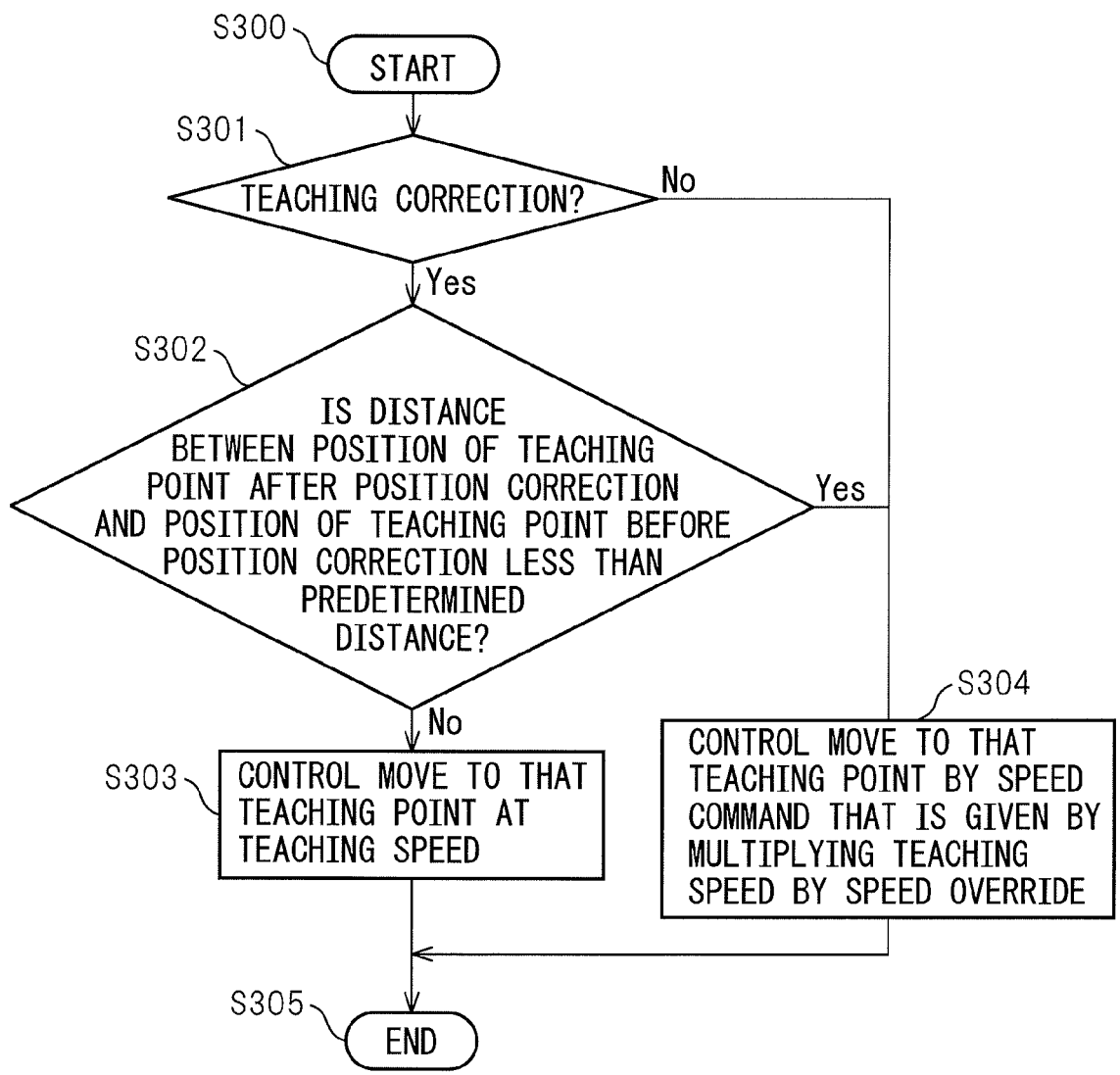
FIG. 12 is a flowchart for explaining the steps of operation of the robot according to the second embodiment.

Next, the operation steps of the robot 101 according to the second embodiment will be described with reference to the flowchart of FIG. 12. These operation steps are executed after the robot mechanism unit 1 is operated according to a command position that is given by adding the learning correction amount $u_{j+1}(k)$ that is calculated in the learning control unit 3 to a teaching position that is set in a task program, and a speed command that is given by multiplying a teaching speed that is set in a task program by the speed change ratio that is used when calculating the learning correction amount $u_{j+1}(k)$, and the learning correction amount $u_{j+1}(k)$ is calculated by the learning control unit 3.

First, in step S301, the anti-exception processing unit 46 judges whether or not there is teaching correction. Whether or not there is teaching correction is judged by detecting by the anti-exception processing unit 46 whether or not the position of a teaching point in a task program that is stored in the program teaching unit 51 in the teaching control unit 50 is corrected.

Next, in step S301, if the anti-exception processing unit 46 judges that there is teaching correction, in step S302, the anti-exception processing unit 46 judges whether or not the distance between the position of the teaching point after the position correction and the position of the teaching point before the position correction is less than a predetermined distance. If the distance between the position of the teaching point after the position correction and the position of the teaching point before the position correction equals or exceeds a predetermined distance, the anti-exception processing unit 46 controls the move to the teaching point according to the teaching speed, and, if the distance between the position of the teaching point after the position correction and the position of the teaching point before the position correction is less than a predetermined distance, controls the move to the teaching point according to a speed command. If the distance between the position of the teaching point after the position correction and the position of the teaching point before the position correction equals or exceeds a predetermined distance, in step S303, the anti-exception processing unit 46 controls the move to the teaching point according to the teaching speed, i.e., at a speed not multiplied by the speed change ratio. Although move to the teaching point alone has been described above, it is equally possible to control the operation to move from that teaching point to a next teaching point likewise.

On the other hand, if the distance between the position of the teaching point after the position correction and the position of the teaching point before the position correction is less than a predetermined distance, in step S304, the anti-exception processing unit 46 controls the move to the teaching point by a speed command that is given by multiplying the teaching speed by a speed override.

Also, in the case in step S301 the anti-exception processing unit 46 judges that there is no teaching correction, the anti-exception processing unit 46 likewise controls the move to the teaching point by a speed command.

Figure 13:
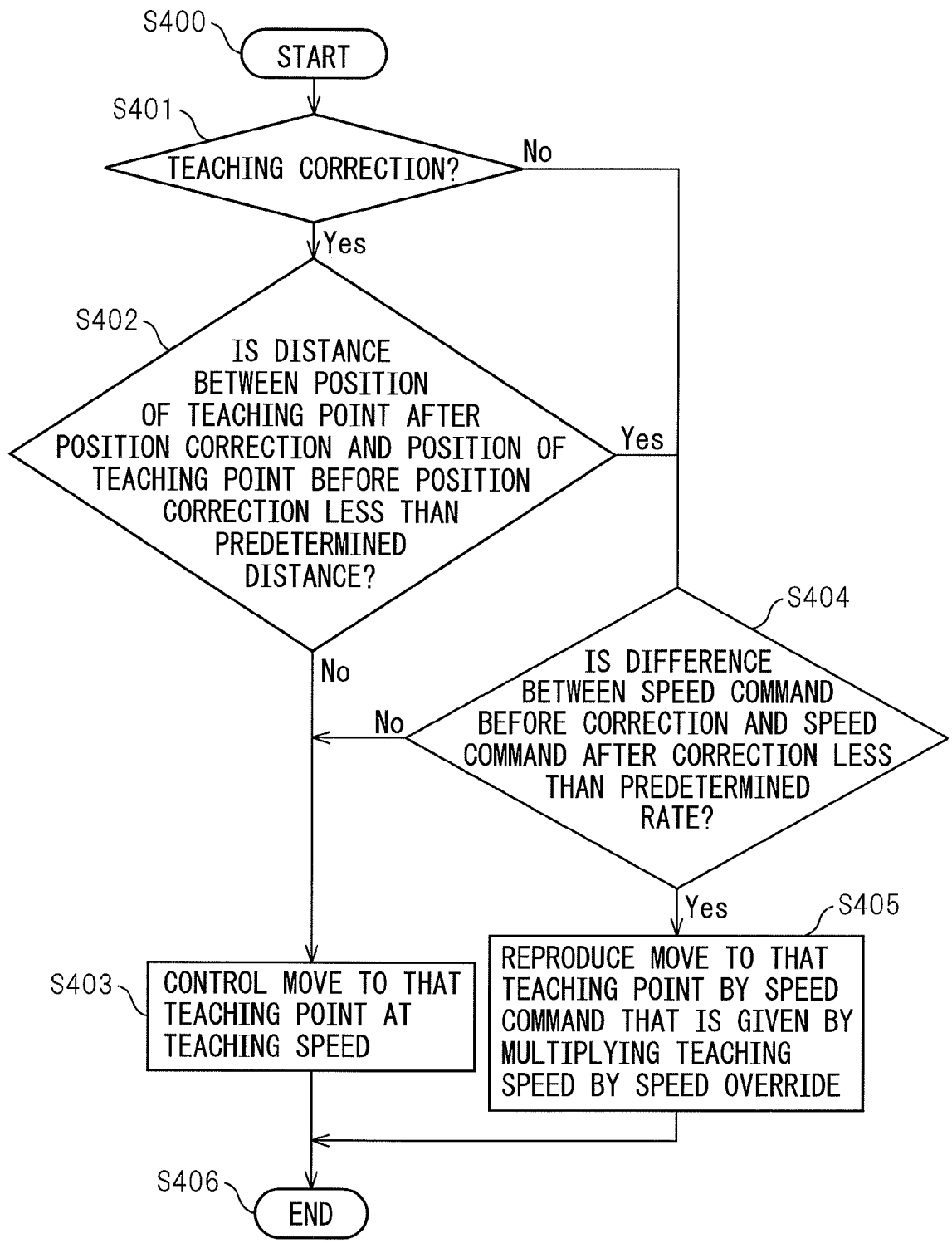
FIG. 13 is a flowchart for explaining the steps of robot operations according to the second embodiment.

The steps of processing in the case a task program that is stored in advance in the program teaching unit 51 corrects the position of the teaching point have been described above. Next, the steps of processing in the case the task program corrects a speed command in addition to the position of the teaching point will be described with reference to the flowchart of FIG. 13.

Steps S401 to S403 and S405 are equivalent to above steps S301 to 304, and therefore will not be described in detail. In step S402, if the distance between the position of a teaching point after position correction and the position of the teaching point before the position correction is less than a predetermined distance, furthermore, in step S404, whether or not the difference between the speed command before correction and the speed command after correction is less than a predetermined rate or a predetermined value is judged. If the difference between the speed command before correction and the speed command after correction is equal to or greater than the predetermined rate or predetermined value, in step S403, the move to the teaching point is controlled at teaching speed, that is, at a speed not multiplied by the speed change ratio.

On the other hand, in step 404, if the difference between the speed command before correction and the speed command after correction is less than a predetermined rate or a predetermined value, in step S405, the move to the teaching point is controlled by a speed command.

As described above, with the robot according to the second embodiment, when the teaching position or teaching speed is corrected by a task program, it is possible to control the operation speed depending on the degree of correction, so that it is possible to allow stable execution of the operation of the robot even when the teaching position or teaching speed in a task program is corrected significantly.

Note that, with the robot 101 according to the second embodiment, like the robot 100 according to the first embodiment, the normal control unit 4 is able to perform processes so that the control target position of the robot mechanism unit 1 moves along a fixed trajectory regardless of the speed change ratio. Furthermore, with the robot 101 according to the second embodiment, like the robot 100 according to the first embodiment, it is possible to provide a high-pass filter for calculating the position vibration component of the robot mechanism unit 1, which does not produce phase shift.

Third Embodiment

Figure 14:
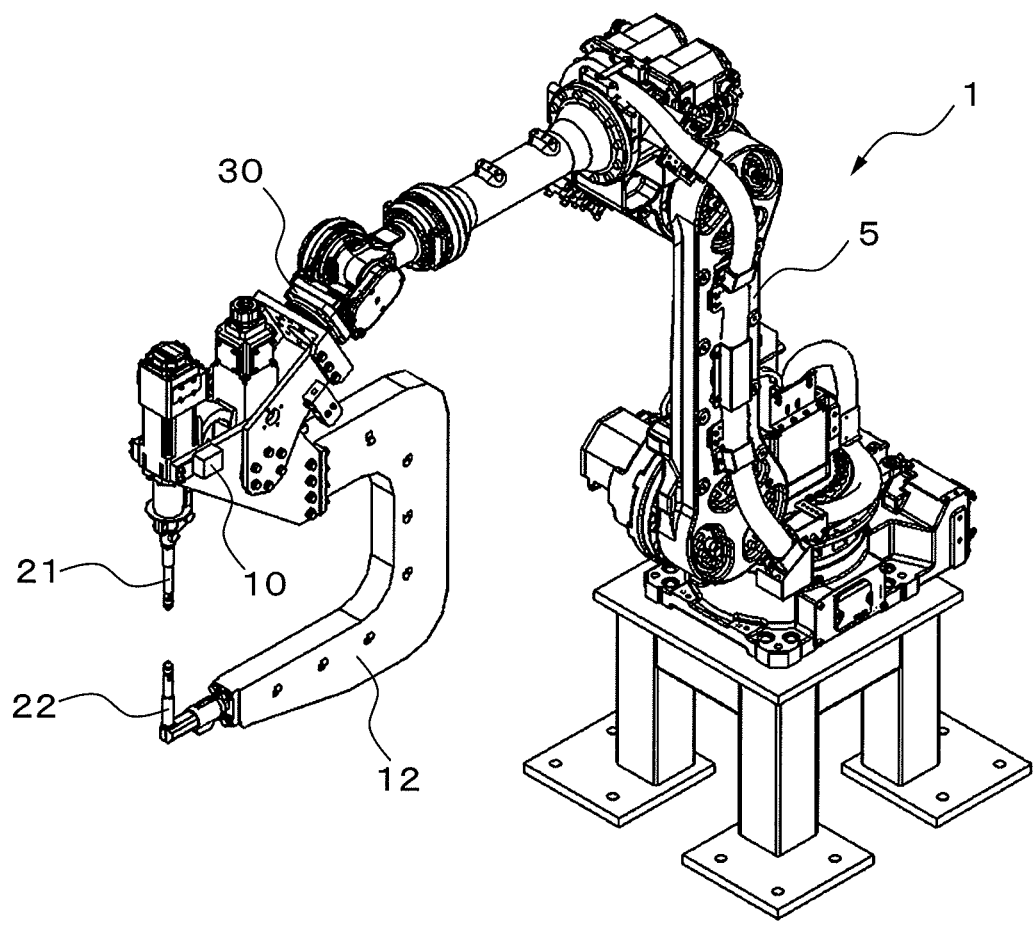
FIG. 14 is a perspective view of a robot mechanism unit in a spot welding robot according to a third embodiment.

With the present embodiment, an example to increase speed of the operation of a spot welding robot will be described. First, FIG. 14 shows a perspective view of a robot mechanism unit of the spot welding robot. Also, FIG. 3 shows a configuration of the robot mechanism unit of the spot welding robot. FIG. 3A shows an overall configuration of the robot mechanism unit, and FIG. 3B shows an enlarged view of a spot welding gun (hereinafter referred to as simply "gun") on which a sensor is mounted. The robot mechanism unit 1 is a well-known robot manipulator and has no limitations regarding its mechanism as long as the gun 12, which is the control target part and is subject to position control, can reach the positions and postures to perform tasks. The gun 12 has a pair of electrodes (namely, a counter electrode 21 and a movable electrode 22), and, by making the interval between the counter electrode 21 and the movable electrode 22 variable by making one of them movable, is able to perform welding for various welding works (not shown). As a sensor for detecting the trajectory and position of the robot mechanism unit 1 and the vibration which may occur when the robot mechanism unit decelerates for pause, an acceleration sensor 10 is mounted at the forward end portion of the gun 12 that forms the control target part of the robot mechanism unit that is subject to position control. A tri-axial acceleration sensor may be used as the acceleration sensor 10. The acceleration sensor 10 has a magnet as a mounting means that can be attached to and detached from the robot mechanism unit 1, and therefore is detachable. The case of the acceleration sensor 10 may be formed with a magnet. An example of using a magnet is only one example, and it is equally possible to form the mounting means using other means.

Figure 15:
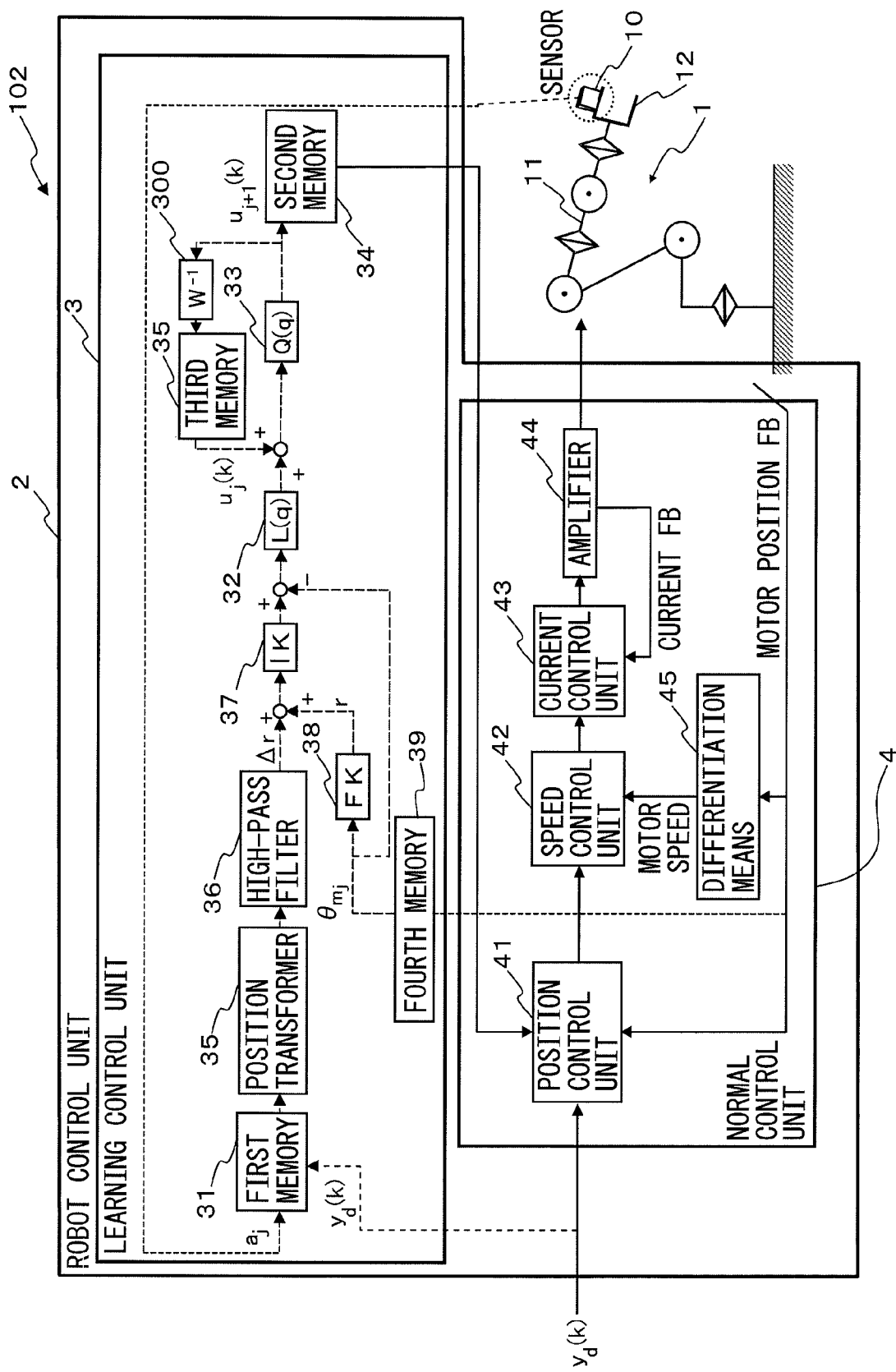
FIG. 15 is a diagram showing a configuration of the spot welding robot according to the third embodiment.

FIG. 15 shows a schematic configuration of a spot welding robot according to a third embodiment. The robot 102 is formed with a robot mechanism unit 1, and a robot control unit 2 that controls the robot mechanism unit 1. The robot mechanism unit 1 has a gun 12 that is the control target part and is subject to position control, and a acceleration sensor 10 that is provided in the gun 12. The robot control unit 2 has a learning control unit 3 that executes learning control for the robot and a normal control unit 4 that directly drives the robot mechanism unit 1. The normal control unit 4 acquires position command data related to the target trajectory or target position of the gun 12 that is the control target part, and, according to position error data that is calculated using the position command data, operates the robot mechanism unit 1 at a predetermined operation speed by the task program.

The learning control unit 3 calculates the trajectory or position of the gun 12 that is the control target part, from the detection result of the acceleration sensor 10, and, by learning control, calculates a learning correction amount, for correcting the trajectory error between the trajectory and the target trajectory or the position error between the position and the target position, or for reducing the vibration of the gun 12 that is the control target part, which is produced when the robot mechanism unit 1 is operated. The normal control unit 4 corrects the position error data using the learning correction amount.

The spot welding robot according to the third embodiment has a feature that, in the course of calculating the learning correction amount, the learning control unit 3 calculates the maximum operation speed that can be set in the robot mechanism unit 1 and calculates the learning correction amount while increasing the operation speed in one time or over a plurality of times until reaching the maximum operation speed. Configurations other than the learning control unit 3 are the same as the configurations of the conventional robot illustrated in FIG. 1 and therefore will not be described in detail.

Figure 16:
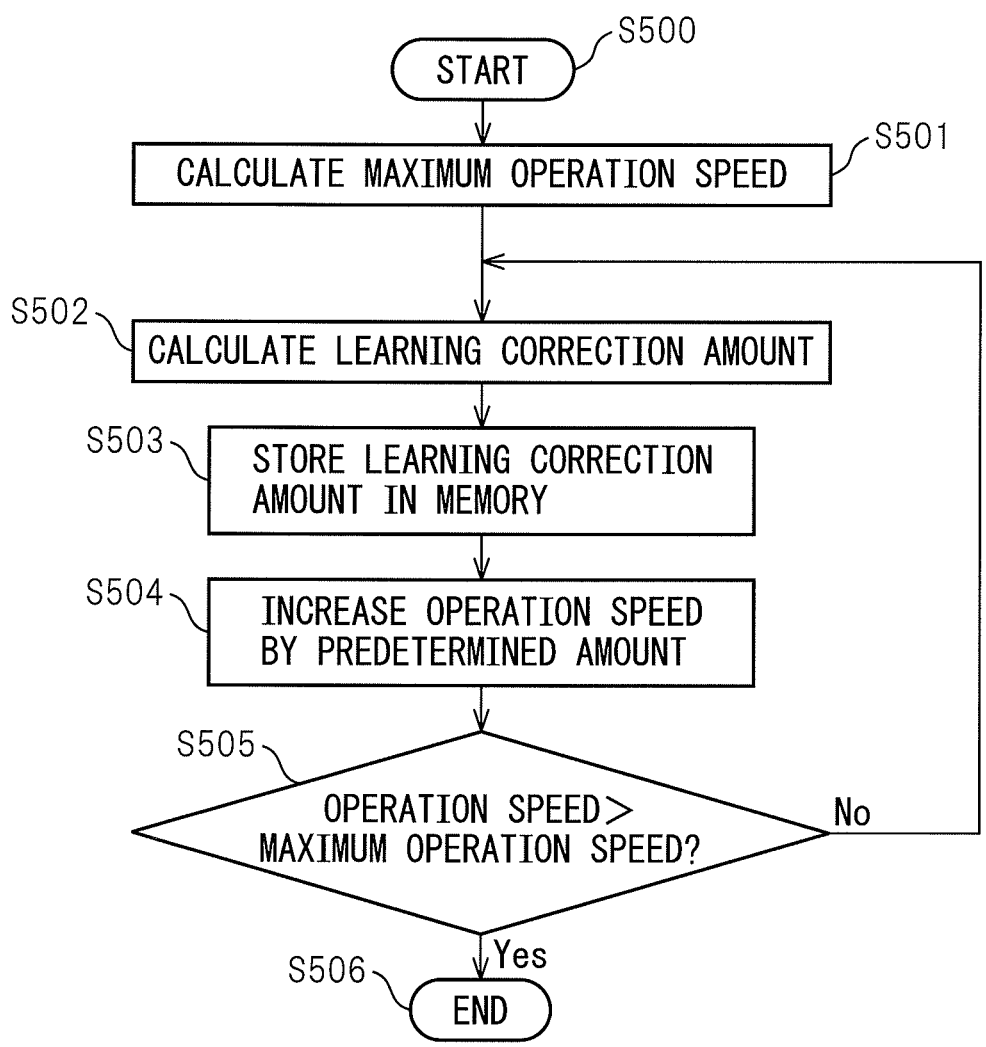
FIG. 16 is a flowchart for explaining the steps of operation of the robot mechanism unit forming the spot welding robot according to the third embodiment.

Next, the steps of operation of the robot mechanism unit according to the third embodiment will be described with reference to drawings. FIG. 16 is a flowchart for explaining the steps of operation of the robot mechanism unit according to the third embodiment. The speed of the operation of the robot mechanism unit is increased as the learning control unit calculates, during learning, i.e., in the course of calculating a learning correction amount (that is, in a learning operating state), the maximum operation speed that can be set in the robot mechanism unit, and calculates a learning correction amount while increasing the operation speed in one time or over a plurality of times until reaching the maximum operation speed. The term "learning operating state" refers to the state of performing learning to calculate a learning correction amount for operating the robot mechanism unit by a task program and making the trajectory or position of the control target position of the robot mechanism unit, calculated from a sensor detection result, approach closer to the target trajectory or target position that is assigned to the normal control unit.

First, in step S501, in the course of calculating a learning correction amount, the learning control unit 3 calculates the maximum operation speed that can be set in the robot mechanism unit. The maximum operation speed can be calculated based on the maximum speed and maximum acceleration that can be tolerated in the robot mechanism unit. To be more specific, first, the robot mechanism unit is operated once, and, from the data of the first trial, the maximum operation speed which each axis motor can learn is calculated from the viewpoint of the maximum acceleration and maximum speed that can be tolerated in the robot mechanism unit.

The maximum speed override $\text{ovr\_max}_{1,i}$ that is calculated from the viewpoint of the maximum acceleration and the maximum speed override $\text{ovr\_max}_{2,i}$ that is calculated from the viewpoint of the maximum speed are as described earlier.

The above two conditions and furthermore the minimum speed override among the axes become the maximum speed override that can be used in learning control. Consequently, assuming that this is expressed as ovr_max, this can be expressed by the following equation.

$$\text{ovr\_max} = \max_i \{\text{ovr\_max}_{1,i}, \text{ovr\_max}_{2,i}\}$$

If there is a target override $\text{ovr\_max}_3$ that is calculated from the cycle time, from these three conditions, the maximum speed override that can be used is calculated from these three conditions.

$$\text{ovr\_max} = \max_i \{\text{ovr\_max}_{1,i}, \text{ovr\_max}_{2,i}, \text{ovr\_max}_{3,i}\}$$

Assuming that the amount of speed override to increase in one step is $\Delta$, the number of steps n is calculated as follows using $\Delta$.

$$n = \text{ceiling}\left(\frac{\text{ovr\_max} - \text{ovr\_cur}}{\Delta}\right)$$

The operation speed is increased up to the maximum operation speed, in, for example, n steps, and the learning control unit 3 executes learning and calculates the learning correction amount. To be more specific, in step S502, the learning control unit 3 repeats learning several times at the initial operation speed, and after the vibration converges, calculates the learning correction amount. Next, in step S503, the learning control unit 3 stores the learning correction amount in a storage unit such as a memory (for example, F-ROM or a memory card (MC)).

Next, in step S504, the learning control unit 3 increases the operation speed by a predetermined amount. Next, in step S505, the learning control unit 3 judges whether or not the operation speed is greater than the maximum operation speed. In the case the operation speed is equal to or lower than the maximum operation speed ("No"), in step S502, the learning control unit 3 executes learning at an operation speed that is increased by a predetermined amount. That is to say, the learning control unit 3 executes learning at a new operation speed, which is a new operation speed given by adding a predetermined amount of speed to the operation speed of the current operation speed. In the case the operation speed is greater than the maximum operation speed ("Yes"), the learning control unit 3 finishes the learning control.

In this way, by repeating a process of increasing the operation speed and a process of learning until the operation speed reaches the maximum operation speed, it is possible to acquire a learning correction amount near the maximum operation speed and increase the speed of the operation of the robot. Also, by increasing the operation speed gradually as with the present embodiment, it is possible to reduce the vibration that is produced in the course of learning, and reduce the vibration that needs to be reduced by correction of the learning correction amount. As a result of this, the effect of reducing vibration (i.e., anti-vibration effect) improves.

In the case of actual operation of operating the robot mechanism unit based on the learning correction amount calculated by learning control, the learning correction amount is transmitted from an F-ROM or a memory card (MC) and reproduced.

Fourth Embodiment

Figure 17:
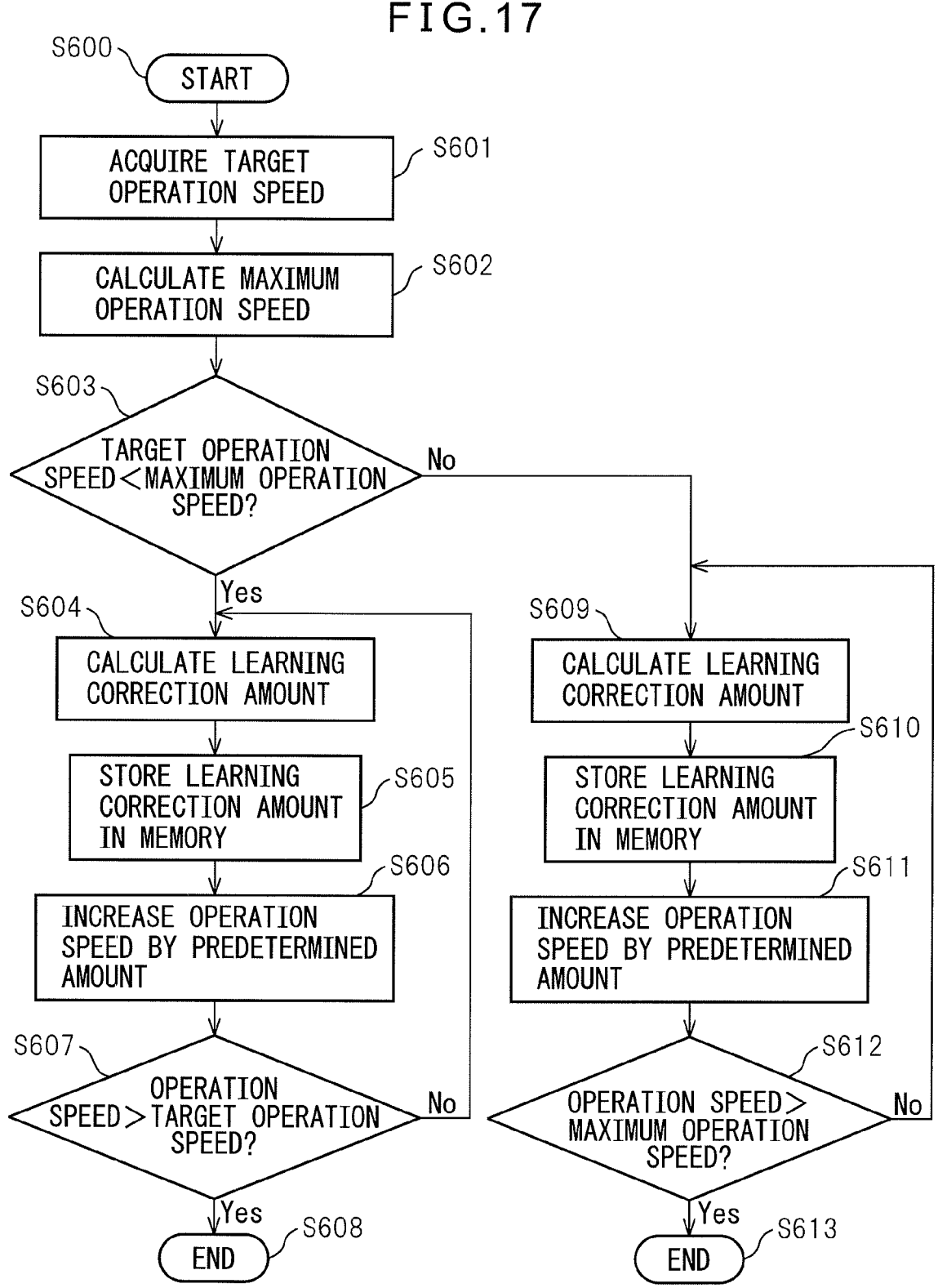
FIG. 17 is a flowchart for explaining the steps of operation of a robot mechanism unit forming a spot welding robot according to a fourth embodiment.

Next, the steps of operation of the robot mechanism unit in a spot welding robot according to a fourth embodiment will be described with reference to drawings. The configuration diagram of the spot welding robot according to the fourth embodiment is the same as in the third embodiment and therefore will not be described in detail. FIG. 17 is a flowchart for explaining the steps of operation of the robot mechanism unit according to the fourth embodiment. The spot welding robot according to the fourth embodiment has a feature that the normal control unit 4 acquires a target operation speed, which is the target value of operation speed of the robot mechanism unit 1, and the learning control unit 3 compares the target operation speed and the maximum operation speed, and, if the target operation speed is lower than the maximum operation speed, calculates a learning correction amount while increasing the operation speed in one time or over a plurality of times until reaching the target operation speed.

First, in step S601, the normal control unit 4 of the spot welding robot acquires the target operation speed from outside. To be more specific, referring to FIG. 15, the position control unit 41 acquires the target operation speed with position command data $y_d(k)$, and transfers these to the speed control unit 42. Next, in step S602, in the course of calculating a learning correction amount, the learning control unit 3 calculates the maximum operation speed that can be set in the robot mechanism unit 1. The maximum operation speed can be calculated based on the maximum speed and maximum acceleration that can be tolerated in the robot mechanism unit. To be more specific, first, the robot mechanism unit is operated once, and, from the data of the first trial, the maximum operation speed which each axis motor can learn is calculated from the viewpoint of the maximum acceleration and maximum speed that can be tolerated in the robot mechanism unit.

The method of calculating the maximum operation speed is the same as in the third embodiment and therefore will not be described in detail.

Next, in steps S603, the learning control unit 3 compares the relationship of magnitude between the acquired target operation speed and the maximum operation speed. If the target operation speed is lower than the maximum operation speed, the learning control unit 3 calculates a learning correction amount while increasing the operation speed in one time or over a plurality of times until reaching the target operation speed. To be more specific, in step S604, the learning control unit 3 repeats learning several times at the initial operation speed, and after the vibration converges, calculates the learning correction amount. Next, in step S605, the learning control unit 3 stores the learning correction amount in a memory, which is, for example, an F-ROM or a memory card (MC)).

Next, in step S606, the learning control unit 3 increases the operation speed by a predetermined amount. Next, in step S607, the learning control unit 3 judges whether or not the operation speed is greater than the maximum operation speed. In the case the operation speed is equal to or lower than the maximum operation speed ("No"), in step S604, the learning control unit 3 executes learning at an operation speed that is given by increasing the operation speed by a predetermined amount. That is to say, the learning control unit 3 executes learning at a new operation speed, which is a new operation speed given by adding a predetermined amount of speed to the operation speed of the current operation speed. In the case the operation speed is greater than the maximum operation speed ("Yes"), the learning control unit 3 finishes the learning control.

In this way, by repeating a process of increasing the operation speed and a process of learning until the operation speed reaches the maximum operation speed, it is possible to acquire a learning correction amount near the maximum operation speed and increase the speed of the operation of the robot. Also, since the operation speed is increased gradually in the present embodiment, it is possible to reduce the vibration that is generated in the course of learning, and reduce the vibration to be suppressed by correction of the learning correction amount. As a result of this, the effect of reducing vibration (i.e., vibration suppression effect) improves. Furthermore, in the case the target operation speed is lower than the maximum operation speed, it becomes unnecessary to increase the operation speed up to the maximum operation speed, so that the learning correction amount can be calculated in short time.

In the case of actual operation of operating the robot mechanism unit based on the learning correction amount calculated by learning control, the learning correction amount is transmitted from an F-ROM or a memory card (MC) and reproduced.

On the other hand, in step S603, in the case the target operation speed is equal to or greater than the maximum operation speed, the learning control unit 3 may finish the learning control or may continue executing learning control until the operation speed reaches the maximum operation speed as was the case in the third embodiment. As one example, FIG. 17 illustrates an example where the learning control unit 3 executes learning control until the operation speed reaches the maximum operation speed. Steps S609 to S611 are the same as above S604 to S606. Next, in step S612, the learning control unit 3 judges whether or not the operation speed is greater than the maximum operation speed. In the case the operation speed is equal to or lower than the maximum operation speed ("No"), in step S609, the learning control unit 3 executes learning by increasing the operation speed by a predetermined amount. That is to say, the learning control unit 3 executes learning at a new operation speed, which is a new operation speed given by adding a predetermined amount of speed to the operation speed of the current operation speed. In the case the operation speed is greater than the maximum operation speed ("Yes"), the learning control unit 3 finishes the learning control.

Although an example has been described above in the present embodiment where, in the case the target operation speed exceeds the maximum operation speed, the learning control unit 3 calculates a learning correction amount by increasing the operation speed up to the maximum operation speed, this example is by no means limited. As described earlier, in the case the target operation speed exceeds the maximum operation speed, the learning control unit 3 may finish learning correction.

Fifth Embodiment

Figure 18:
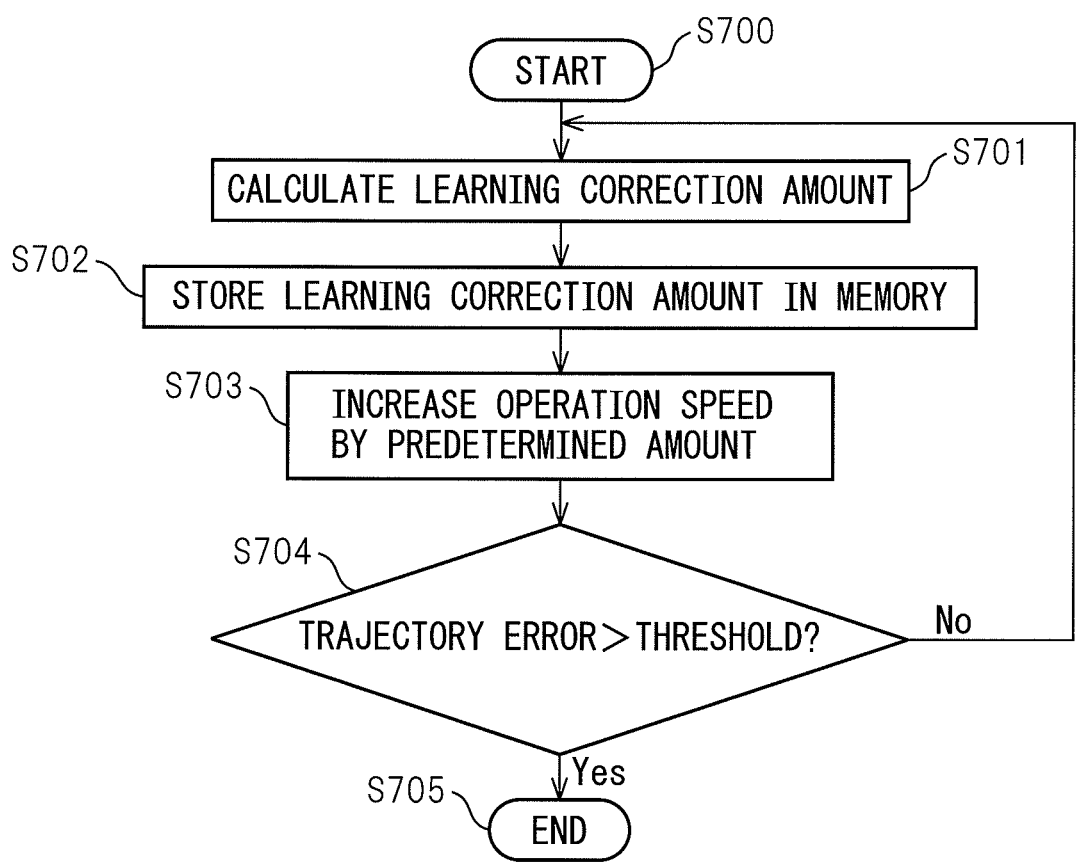
FIG. 18 is a flowchart for explaining the steps of operation of a robot mechanism unit forming a spot welding robot according to a fifth embodiment.

Next, the steps of operation of the robot mechanism unit in a spot welding robot according to a fifth embodiment will be described with reference to drawings. The configuration of the spot welding robot according to the fifth embodiment is the same as in the third embodiment and therefore will not be described in detail. FIG. 18 is a flowchart for explaining the steps of operation of the robot mechanism unit according to the fifth embodiment. The spot welding robot according to the fifth embodiment has a robot mechanism unit 1 including a gun 12 that is the control target part and is subject to position control, and a acceleration sensor 10 that is mounted on the gun 12 that is the control target part, a normal control unit 4 that acquires position command data related to the target trajectory or target position of the gun 12 that is the control target part, and, according to position error data that is calculated using the position command data, operates the robot mechanism unit 1 at a predetermined operation speed by a task program, and a learning control unit 3 that, calculates trajectory or position of the gun 12 that is the control target part from the result detected by the acceleration sensor 10, and calculates a learning correction amount by learning control, for correcting the trajectory error between the trajectory and the target trajectory or the position error between the position and the target position, or for reducing the vibration of the gun 12 that is the control target part, which is produced when the robot mechanism unit 1 is operated, and, the normal control unit 4 corrects the position error data using the learning correction amount, and the learning control unit 3 calculates the learning correction amount, performs a process to compare the trajectory error or position error, or the vibration, within each threshold, and performs the above process while increasing the operation speed until the trajectory error or position error, or the vibration, exceeds each threshold.

The steps of operation of the spot welding robot according to the fifth embodiment will be described below. First, in step S701, the learning control unit 3 repeats learning several times at the initial operation speed. After the vibration converges, the learning control unit 3 calculates the trajectory or position of the gun 12, which is the control target part, based on a detection result of the acceleration sensor 10. Next, by learning control, the learning control unit 3 calculates a learning correction amount, for correcting the trajectory error between the trajectory and the target trajectory or the position error between the position and the target position, or for reducing the vibration of the gun 12 that is the control target part, which is produced when the robot mechanism unit 1 is operated. Next, in step S702, the learning control unit 3 stores the learning correction amount in a storage unit, which is, for example, an F-ROM or a memory card (MC).

Next, in step S703, the learning control unit 3 increases the operation speed by a predetermined amount. Next, in step S704, the learning control unit 3 judges whether or not the trajectory error or position error, or the vibration, exceeds each threshold value. Although an example of judging the relationship of magnitude between the trajectory error and its threshold value is illustrated in FIG. 18, the same applies to the position error and vibration. The thresholds for the trajectory error, position error and vibration can be stored in a memory in advance. Next, in step S704, in the case the trajectory error exceeds the threshold, the learning control unit 3 finishes the process. On the other hand, in the case the trajectory error is equal to or lower than the threshold, back to step S701, the learning control unit 3 repeats learning. For example, when operation is executed at an operation speed of 50 [mm/sec] and the trajectory error is equal to or lower than the threshold, or when operation is executed at an operation speed of 100 [mm/sec] and the trajectory error exceeds the threshold, a learning correction amount is calculated with respect to the case of the operation speed of 50 [mm/sec], and is not calculated with respect to the case of the operation speed of 100 [mm/sec]. In this way, it is possible to calculate a learning correction amount to keep the trajectory error within a range of a predetermined threshold.

Now, the method of increasing the operation speed will be described in detail. Like the present embodiment, in the case the maximum operation speed is not set, i.e., in the case the maximum speed override is not set, insofar as the trajectory error, for example, 100 [msec] (0.1 [sec]) before the end of the operation period, stays within a threshold, the override is increased by a certain amount. By repeating this process, speed is increased.

Assume that the amount of vibration is with $\psi_j(t)$ and the operation end time is t_end. Then, the condition that the amount of vibration stays within a threshold can be expressed as follows.

$$\psi_j(t-(t\_end-l))<\phi_{max}$$

(l∈R, L<0.1)

In the case the target operation speed is not set, i.e., in the case the target override is not set, the override is increased until the above condition is met. Assume that the override for the present trial is over_cur.

In the case the target override over_max$_3$ is calculated by the cycle time as in the fourth embodiment, while the above conditions and following condition are both met, the override is increased.

$$\text{over\_cur}<\text{over\_max}_3$$

As described above, with the spot welding robot according to the present embodiment, it is possible to calculate a learning correction amount in a state in which the operation speed is increased within a range where the trajectory error or the like stays within a predetermined threshold, so that the operation speed of the spot welding robot can be increased within a certain range of trajectory error or the like.

Sixth Embodiment

Figure 19:
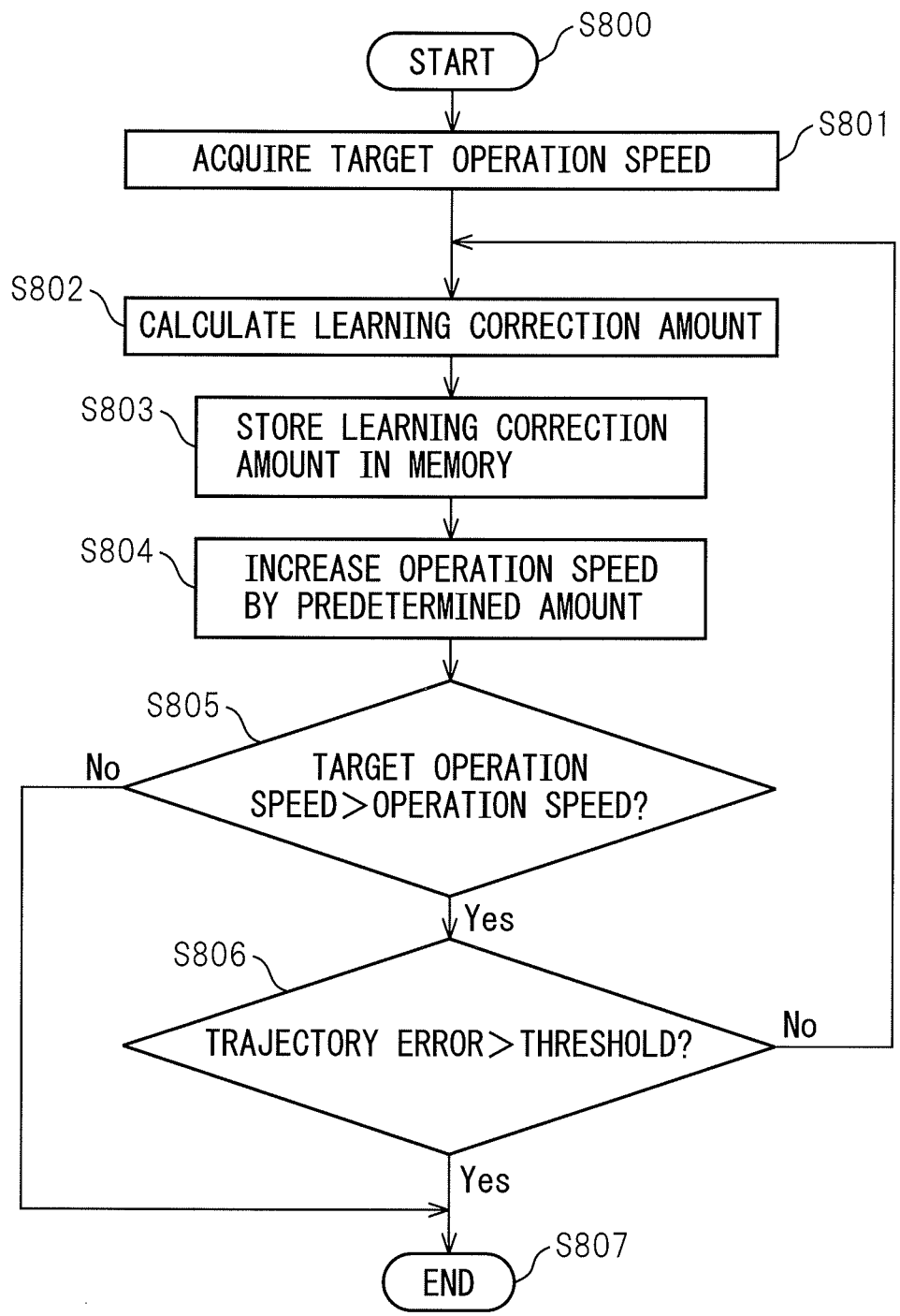
FIG. 19 is a flowchart for explaining the steps of operation of a robot mechanism unit forming a spot welding robot according to a sixth embodiment.

Next, the steps of operation of the robot mechanism unit in a spot welding robot according to a sixth embodiment will be described with reference to drawings. The configuration of the spot welding robot according to the sixth embodiment is the same as in the third embodiment and therefore will not be described in detail. FIG. 19 is a flowchart for explaining the steps of operation of the robot mechanism unit according to the sixth embodiment. The spot welding robot according to the sixth embodiment has a feature that the normal control unit 4 acquires a target operation speed, which is the target value of operation speed of the robot mechanism unit 1, and the learning control unit 3 increases the operation speed in one time or over a plurality of times until reaching the target operation speed, and upon every increase, performs a process of calculating a learning correction amount and comparing the trajectory error or position error, or the vibration, within each threshold that is set in advance, and repeats the process as long as the trajectory error or position error, or the vibration, stays within each threshold, or until the operation speed reaches the target operation speed.

The steps of operation of the spot welding robot according to the sixth embodiment will be described below. First, in step S801, the normal control unit 4 of the spot welding robot acquires the target operation speed from outside. To be more specific, referring to FIG. 15, the position control unit 41 acquires the target operation speed with position command data $y_d(k)$, and transfers them to the speed control unit 42. Next, in step S802, the learning control unit 3 repeats learning several times at the initial operation speed. After the vibration converges, the learning control unit 3 calculates the trajectory or position of the gun 12, which is the control target part, from a detection result of the acceleration sensor 10. By learning control, the learning control unit 3 calculates a learning correction amount, for correcting the trajectory error between the trajectory and the target trajectory or the position error between the position and the target position, or for reducing the vibration of the gun 12 that is the control target part, which is produced when the robot mechanism unit 1 is operated. Next, in step S803, the learning control unit 3 stores the learning correction amount in a storage unit, which is, for example, an F-ROM or a memory card (MC).

Next, in step S804, the learning control unit 3 increases the operation speed by a predetermined amount. Next, in steps S805, the learning control unit 3 compares the relationship of magnitude between the acquired target operation speed and the maximum operation speed. If the target operation speed is lower than the maximum operation speed, in step S806, the learning control unit 3 judges whether or not the trajectory error or position error, or the vibration, exceeds each threshold. Although an example of judging the relationship of magnitude between the trajectory error and its threshold value is illustrated in FIG. 19, the same applies to the position error and vibration. The thresholds for the trajectory error, position error and vibration can be stored in a memory in advance.

In step S806, the learning control unit finishes the process in the case the trajectory error exceeds the threshold. In the case the trajectory error is equal to or lower than the threshold, back to step S802, the learning control unit 3 repeats learning. For example, when operation is executed at an operation speed of 50 [mm/sec] and the trajectory error is equal to or lower than the threshold, and when operation is executed at an operation speed of 100 [mm/sec] and the trajectory error exceeds the threshold, a learning correction amount is calculated with respect to the case of the operation speed of 50 [mm/sec], and is not calculated with respect to the case of the operation speed of 100 [mm/sec]. In this way, it is possible to calculate a learning correction amount to keep the trajectory error within a range of a predetermined threshold. On the other hand, in step S805, in the case the target operation speed is equal to or greater than the maximum operation speed, the learning control unit 3 finishes the process.

The present embodiment is designed to calculate a learning correction amount within a range in which the operation speed does not exceed the target operation speed and within a range in which the trajectory error or the like does not exceed a threshold, so that it is possible to calculate a learning correction amount to satisfy both conditions of the target operation speed and the trajectory error or the like. Consequently, it is possible to calculate a learning correction amount in a state in which the operation speed is increased within a range in which the operation speed stays within the target operation speed that is set and within a range in which the trajectory error or the like stays within a range of a predetermined threshold, so that it is possible to increase the operation speed of the spot welding robot within a range of a predetermined target operation speed and within a range of certain trajectory error or the like.

Although a case has been described above with the present embodiment where an acceleration sensor is used as a sensor to mount on the robot mechanism unit, it is equally possible to use any sensor such as a vision sensor, a gyro sensor, an inertial sensor, an optical sensor or a distortion gage.

For an example, a case of using a vision sensor instead of an acceleration sensor is illustrated in FIG. 20. The vision sensor 70 has two cameras of a first camera 72 and a second camera 73, and is mounted on a robot hand 71. The vision sensor 70 measures the position of a virtual TCP 76 on a target line 74 using the cameras 72 and 73, and calculates $\Delta x$, $\Delta y$ and $\Delta z$, which are the trajectory/vibration errors in the axis directions of the X axis, Y axis and Z axis, respectively, where the forward direction 75 is the positive direction along the X axis.

What is claimed is:

1. A robot comprising a robot mechanism unit that has a sensor in a part that is subject to position control, and a control unit that controls an operation of the robot mechanism unit, wherein the control unit comprises:

a normal control unit that controls the operation of the robot mechanism unit;

a learning control unit that, when the robot mechanism unit is operated by a speed command given by multiplying a teaching speed designated in a task program by a speed change ratio, calculates, from a result detected by the sensor, a learning correction amount configured to make a trajectory or position of a control target of the robot mechanism unit approach a target trajectory or target position that is assigned to the normal control unit, or a learning correction amount configured to reduce a vibration of the control target that is produced when the robot mechanism unit is operated; and a teaching control unit configured to teach or correct a position or speed in the task program, and performs processes so that a control target position of the robot mechanism unit moves on a fixed trajectory regardless of the speed change ratio, wherein the normal control unit operates the robot mechanism unit by a position command that is based on the teaching position set in the task program, the learning correction amount that is calculated by the learning control unit, and the speed command that is given by multiplying the teaching speed set in the task program by the speed change ratio that is used upon calculation of the learning correction amount, and, after the learning correction amount is calculated by the learning control unit, when the position of a teaching point is corrected by the teaching control unit, if a distance between the position of the teaching point after the position correction and the position of the teaching point before the position correction is equal to or greater than a predetermined distance, controls move to the teaching point at the teaching speed, and, if the distance is less than the predetermined threshold, controls the move to the teaching point by the speed command.

2. The robot as claimed in claim 1, wherein the learning control unit executes learning to calculate the learning correction amount while changing the speed change ratio over a plurality of times until reaching a predetermined maximum speed change ratio.

3. The robot as claimed in claim 2, wherein the predetermined maximum speed change ratio is calculated by the learning control unit, based on data acquired when the robot mechanism unit is operated, a maximum speed and maximum acceleration that can be tolerated in the robot mechanism unit, or a duration of life of a decelerator.

4. The robot as claimed in claim 2, wherein the predetermined speed change ratio is set in the control unit from outside.

5. The robot as claimed in claim 1, wherein, after the learning correction amount is calculated by the learning control unit, when the position of the teaching point is corrected by the teaching control unit, if the distance between the position of the teaching point after the position correction and the position of the teaching point before the position correction is equal to or greater than the predetermined distance, the normal control unit controls the move to the teaching point and move from the teaching point to a next teaching point at the teaching speed, and, if the distance is less than the predetermined threshold, controls the move to the teaching point and the move from the teaching point to the next teaching point by the speed command.

6. The robot as claimed in claim 1, wherein, after the learning correction amount is calculated by the learning control unit, when the speed command is corrected by the teaching control unit, if a difference between the speed command after the correction and the speed command before the correction is equal to or greater than a predetermined rate or a predetermined value, the normal control unit controls the move to the teaching point at the teaching speed, and, if the difference is lower than the predetermined rate or the predetermined value, controls the move to the teaching point by the speed command.

7. The robot as claimed in claim 1, wherein the learning control unit comprises a filter for calculating a position vibration component of the robot mechanism unit from data detected by the sensor.

8. The robot as claimed in claim 7, wherein the learning control unit calculates a position on each axis including the position vibration component by inverse-transforming the data detected by the sensor into three basic axes of each axis of the robot.

9. The robot as claimed in claim 1, wherein the learning control unit makes the robot mechanism unit execute a predetermined operation, and calculates a position and inclination of the sensor.

10. The robot as claimed in claim 1, wherein the learning control unit further comprises a memory for storing the learning correction amount.

11. The robot as claimed in claim 1, wherein the sensor is one of a vision sensor, an acceleration sensor, a gyro sensor, an inertial sensor, an optical sensor and a distortion gauge.

12. The robot as claimed in claim 1, wherein the sensor comprises a mounting section that can be attached to and detached from the robot mechanism unit.

13. The robot as claimed in claim 12, wherein the sensor comprises a magnet as the mounting section.

14. A spot welding robot comprising:
a robot mechanism unit that comprises a control target part that is subject to position control and a sensor that is mounted on the control target part;
a normal control unit that acquires position command data related to a target trajectory or target position of the control target part, and, according to position error data that is calculated using the position command data, operates the robot mechanism unit at a predetermined operation speed, by a task program; and
a learning control unit that calculates a trajectory or position of the control target part from a detection result of the sensor, and, by learning control, calculates a learning correction amount, configured to correct a trajectory error between the trajectory and the target trajectory or a position error between the position and the target position, or reduce a vibration of the control target part that is produced when the robot mechanism unit is operated, wherein:
the normal control unit corrects the position error data using the learning correction amount; and
the learning control unit, in a course of calculating the learning correction amount, calculates maximum speed overrides based on maximum acceleration and maximum speed, respectively, that can be tolerated in the robot mechanism unit by operating the robot mechanism unit, and calculates a maximum operation speed that can be set in the robot mechanism unit based on the minimum value among the calculated maximum speed overrides, and calculates the learning correction amount while increasing the operation speed in one time or over a plurality of times until reaching the maximum operation speed.

15. The spot welding robot as defined in claim 14, wherein:
the normal control unit acquires a target operation speed, which is a target value of the operation speed of the robot mechanism unit; and
the learning control unit compares the target operation speed and the maximum operation speed, and, when the target operation speed is less than the maximum operation speed, calculates the learning correction amount while increasing the operation speed in one time or a plurality of times until reaching the target operation speed.

16. The spot welding robot as defined in claim 14, wherein the learning control unit calculates the maximum operation speed based on a maximum speed and maximum acceleration that can be tolerated in the robot mechanism unit.

17. The spot welding robot as defined in claim 14, wherein the learning control unit calculates data on each axis by transforming data that is calculated from the detection result of the sensor and that includes the trajectory error, the position error or a vibration component of the control target part, into position coordinates based on each axis of the robot mechanism unit.

18. The spot welding robot as defined in claim 14, wherein the learning control unit makes the robot mechanism unit execute a predetermined operation and calculates a position and inclination of the sensor.

19. The spot welding robot as defined in claim 14, further comprising a storage unit for storing the learning correction amount.

20. The spot welding robot as defined in claim 14, wherein the sensor is one of a vision sensor, an acceleration sensor, a gyro sensor, an inertial sensor and a distortion gauge.

21. The spot welding robot as defined in claim 14, further comprising a mounting section that allows the sensor to be attached to and detached from the robot mechanism unit.

22. A spot welding robot comprising:
- a robot mechanism unit that comprises a control target part that is subject to position control and a sensor that is mounted on the control target part;
- a normal control unit that acquires position command data related to a target trajectory or target position of the control target part, and, according to position error data that is calculated using the position command data, operates the robot mechanism unit at a predetermined operation speed, by a task program; and
- a learning control unit that calculates a trajectory or position of the control target part from a detection result of the sensor, and, by learning control, calculates a learning correction amount, configured to correct a trajectory error between the trajectory and the target trajectory or a position error between the position and the target position, or reduce a vibration of the control target part that is produced when the robot mechanism unit is operated, wherein:
- the normal control unit corrects the position error data using the learning correction amount; and
- the learning control unit performs a process of calculating the learning correction amount and comparing the trajectory error or the position error, or the vibration, with each threshold that is set in advance, and repeats the process, while increasing the operation speed, until the trajectory error or the position error, or the vibration, exceeds each threshold, and increases the operation speed by repeating process of increasing a predetermined amount of override, as long as the trajectory error or the position error, or the vibration, stays within each threshold in a predetermined period before the end of the operation period.

* * * * *